(12) United States Patent
Borland et al.

(10) Patent No.: US 7,961,187 B2
(45) Date of Patent: Jun. 14, 2011

(54) METHODS, SYSTEMS, AND COMPUTER READABLE MEDIA FOR FLEXIBLE OCCLUSION RENDERING

(75) Inventors: David Borland, Chapel Hill, NC (US); John P. Clarke, Chapel Hill, NC (US); Russell M. Taylor, II, Pittsboro, NC (US)

(73) Assignee: The University of North Carolina, Chapel Hill, NC (US)

( * ) Notice: Subject to any disclaimer, the term of this patent is extended or adjusted under 35 U.S.C. 154(b) by 0 days.

(21) Appl. No.: 12/532,373

(22) PCT Filed: Mar. 20, 2008

(86) PCT No.: PCT/US2008/003634
§ 371 (c)(1),
(2), (4) Date: Feb. 16, 2010

(87) PCT Pub. No.: WO2008/115534
PCT Pub. Date: Sep. 25, 2008

(65) Prior Publication Data
US 2010/0134491 A1    Jun. 3, 2010

Related U.S. Application Data

(60) Provisional application No. 60/919,079, filed on Mar. 20, 2007.

(51) Int. Cl.
*G06T 15/00* (2011.01)

(52) U.S. Cl. ........ 345/424; 345/419; 345/420; 345/422; 382/152; 382/154

(58) Field of Classification Search .................. 345/419, 345/420, 422, 424; 382/152, 154
See application file for complete search history.

(56) References Cited

U.S. PATENT DOCUMENTS

| 6,310,620 | B1 | 10/2001 | Lauer et al. | |
| 6,771,263 | B1 | 8/2004 | Behrens et al. | |
| 6,798,412 | B2 * | 9/2004 | Cowperthwaite | 345/428 |
| 6,990,169 | B2 | 1/2006 | Claus et al. | |
| 2002/0113787 | A1 | 8/2002 | Ray et al. | |

(Continued)

FOREIGN PATENT DOCUMENTS

WO    WO 2006/099490 A1    9/2006

(Continued)

OTHER PUBLICATIONS

Kaufman et al., "Virtual Colonoscopy," Communications of the ACM, vol. 48, No. 2, pp. 37-41 (Feb. 2005).Clarke, J.P. (2004). Personal communication.

(Continued)

*Primary Examiner* — Phu Nguyen
(74) *Attorney, Agent, or Firm* — Jenkins, Wilson, Taylor & Hunt, P.A.

(57) ABSTRACT

The invention relates to flexible occlusion rendering, including receiving a first set of three dimensional image data including image data for a surface of interest and image data for a region occluding the surface of interest from a desired viewpoint. The purpose of this invention is to improve occlusion rendering via imaging by locating the occluding surface of the incoming three-dimensional data and, and modifying the characteristics of this data, to show the surface that is being occluded so that the image includes viewing through the occlusion to the surface of interest.

33 Claims, 37 Drawing Sheets

U.S. PATENT DOCUMENTS

2002/0122038 A1  9/2002  Cowperthwaite
2009/0103793 A1  4/2009  Borland et al.

FOREIGN PATENT DOCUMENTS

WO    WO 2008/115534 A1    9/2008

OTHER PUBLICATIONS

Sahin et al., "Virtual MR Arthroscopy of the Wrist Joint: A New Intaarcular Perspective," Skeletal Radiology vol. 33, pp. 9-14 (2004).
Lee et al., "CT Arthrography and Virtual Arthroscopy in the Siagnosis of the Anterior Cruciate Ligament and Meniscal Abnormalities of the Knee Joint," Korean Journal of Radiology, vol. 5, No. 1, pp. 47-54 (Mar. 2004).
Tory et al., "A Parallel Coordinates Style Interface for Exploratory Volume Visualization," IEEE Transactions on Visualization and Computer Graphics, vol. 11, No. 1, pp. 1-10 (Mar. 2004).
Viola et al., "Importance-Driven Volume Rendering," IEEE Visualization 2004, Austin, TX, pp. 1-7 (2004).
Kniss et al., "Gaussian Transfer Functions for Multi-Field Volume Visualization," IEEE Visualization Conference 2003, pp. 497-504 (2003).
Hadwiger et al., "High-Quality Two-Level Volume Rendering of Segmented Data Sets on Consumer Graphics Hardware," IEEE Visualization 2003, pp. 1-8 (2003).
Diepstraten et al., "Interactive Cutaway Illustrations," Computer Graphics Forum, vol. 22, No. 3, pp. 1-10 (2003).
Hönigmann et al., "Adaptive Design of a Global Opacity Transfer Function for Direct Volume Rendering of Ultrasound Data," IEEE Visualization 2003, Seattle, pp. 489-496 (2003).
Kindlmann et al., "Curvature-Based Transfer Functions for Direct Volume Rendering: Methods and Applications," IEEE Visualization 2003, Seattle, pp. 1-5 (2003).
Kruger et al., "Acceleration Techniques for GPU-based Volume Rendering," IEEE Visualization 2003, Seattle, WA, pp. 1-6 (2003).
Nagy et al., "Depth-Peeling for Texture-Based Volume Rendering," 11th Pacific Conference on Computer Graphics and Applications, pp. 1-5 (2003).
Sherbondy et al., "Fast Volume Segmentation with Simultaneous Visualization using Programmable Graphics Hardware," IEEE Visualization 2003, Seattle, WA, pp. 1-6 (2003).
Sears et al., "Prospective Comparison of Computerized Tomography and Excretory Urography in the Initial Evaluation of Asymptomatic Microhematuria," Journal of Urology, vol. 168, pp. 2457-2460 (Dec. 2002).
McTavish et al., "Multi-Detector Row CT Urography: Comparison of Strategies for Depicting the Normal Urinary Collecting System," Radiology, vol. 225, No. 3, pp. 783-790 (Dec. 2002).
Caoili et al., "Urinary Tract Abnormalities: Initial Experience with Multi-Detector Row CT Urography," Radiology, vol. 222, No. 2, pp. 353-360 (Feb. 2002).
Fielding et al., "Tumor Detection by Virtual Cystoscopy with Color Mapping of Bladder Wall Thickness," Journal of Urology, vol. 167, pp. 559-562 (Feb. 2002).
Diepstraten et al., "Transparency in Interactive Technical Illustration," Computer Graphics Forum, vol. 21, No. 3, pp. 1-11 (2002).
Everitt, "Interactive Order-Independent Transparency," Tech Report, Nvidia Corporation, pp. 1-11 (2002).
Kniss et al., "Interactive Volume Rendering using Multi-Dimensional Transfer Functions and Direct Manipulation Widgets," IEEE Visualization 2001, San Diego, pp. 1-8 (2001).
Choi et al., "Efficient Volumetric Ray Casting for Isosurface Rendering," Computers & Graphics, vol. 24, No. 4, pp. 661-670 (2000).
Ebert et al., "Volume Illustration: Non-Photorealistic Rendering of Volume Models," Proceedings of IEEE Visualization 2000, IEEE Computer Society Press, pp. 1-8 (Oct. 2000).
Hladůvka at al., "Curvature-Based Transfer Functions for Direct Volume Rendering," Proceedings of SCCG 2000, pp. 1-8 (2000).
Wan et al., "Volume Rendering Based Interactive Navigation within the Human Colon," IEEE Visualization '99, pp. 397-400 (1999).
Weishaupt et al., "Virtual MR Arthroscopy: New Insights into Joint Morphology," Journal of Magnetic Resonance Imaging, vol. 9, pp. 757-760 (1999).
Applegate, "Three-Dimensional MR Arthrography of the Shoulder: An Intraarticular Perspective," American Journal of Radiology, vol. 171, pp. 239-241 (Jul. 1998).
Cootes et al., "Active Shape Models—Smart Snakes," In Proceedings of European Conference on Computer Vision, pp. 484-498 (1998).
Parker et al., "Interactive Ray Tracing for Isosurface Ray Casting," IEEE Visualization 1998, pp. 233-238, p. 538 (1998).
McNicholas et al., "Excretory Phase CT Urography for Opacification of the Urinary Collecting System," American Journal of Radiology, vol. 170, pp. 1261-1267 (May 1998).
Kindlmann et al., "Semi-Automatic Generation of Transfer Functions for Direct Volume Rendering," Proceedings of IEEE Symposium on Volume Visualization 1998, pp. 1-8 (1998).
Interrante et al., "Conveying the 3d Shape of Smoothly Curving Transparent Surfaces via Texture," IEEE Transactions on Visualization and Computer Graphics, vol. 3, No. 2, pp. 98-117 (Apr.-Jun. 1997).
Tam et al., "Volume Rendering of Abdominal Aortic Aneurysms," Visualization '97, Phoenix, AZ, pp. 1-9 (Mar. 31, 1997).
Diefenbach, "Pipeline Rendering: Interaction and Realism through Hardware-Based Multi-Pass Rendering," University of Pennsylvania, Department of Computer Science, Ph.D. Dissertation (1996).
Rheingans, "Opacity-Modulating Triangular Textures for Irregular Surfaces," Proceedings of Visualization '96, IEEE Computer Society, pp. 1-8 (1996).
Lin et al., "An Efficient Volume-Rendering Algorithm with an Analytic Approach," The Visual Computer, vol. 12, No. 10, pp. 515-526 (1996).
Zuiderveld et al., "Clinical Evaluation of Interactive Volume Visualization," IEEE Visualization, pp. 367-370 (1996).
Sethian, J.A., "A Marching Level Set Method for Monotonically Advancing Fronts," In Proceedings of National Academy of Sciences (1996).
Hemminger et al., "Clinical Applications of Real-Time Volume Rendering," SPIE Medical Imaging, pp. 1-12 (1995).
Cootes et al., "Active Appearance Models," In Proceedings of British Machine Vision, pp. 266-275 (1992).
Mammen, A., "Transparency and Antialiasing Algorithms Implemented With the Virtual Pixel Maps Technique," IEEE Computer Graphics and Applications, 9(4):43-55 (1989).
Kass et al., "Snakes: Active Contour Models," International Journal of Computer Vision, 1(4):321-331 (1988).
Osher et al., "Fronts Propagating With Curvature Dependent Speed: Algorithms Based on Hamilton-Jacobi Formulations," Journal of Computational Physics, 79:12-49 (1988).
Levoy, "Display of Surfaces from Volume Data," IEEE Computer Graphics and Applications, vol. 8, No. 3, pp. 1-10 (Feb. 1988).
Canny, J. A., "Computational Approach to Edge Detection," IEEE transactions on Pattern Analysis and Machine Intelligence, 8(6):679-698 (1986).

* cited by examiner

```
rayPosition ← rayBegin;
accumulatedColor ← (0.0,0.0,0.0);
remainingOpacity ← 1.0;
reachedThreshold ← false;
while rayPosition < rayEnd do
    // Sampling
    sampleValue ← InterpolateValue(rayPosition);
    // ///////////////////////////////////////////
    // Fixed-Threshold VDP
    if !reachedThreshold then
        if sampleValue >= threshold then
            accumulatedColor ← (0.0,0.0,0.0);
            remainingOpacity ← 1.0;
            reachedThreshold ← true;
        end
    end
    // ///////////////////////////////////////////
    // Transfer function evaluation
    sampleColor ← ColorTransferFunction(value);
    sampleOpacity ← OpacityTransferFunction(value);

// Shading
    sampleGradient ← InterpolateGradient(rayPosition);
    shadedColor ← DoShading(sampleColor, sampleGradient);

// Compositing
    accumulatedColor ← accumulatedColor + shadedColor * sampleOpacity * remainingOpacity;
    remainingOpacity ← (1.0 - sampleOpacity) * remainingOpacity;

// Increment position
    rayPosition ← IncrementRayPosition(rayPosition);
end
```

FIG. 11

```
rayPosition ← rayBegin;
accumulatedColor ← (0.0,0.0,0.0);
remainingOpacity ← 1.0;
reachedThreshold ← false;
while rayPosition < rayEnd do
    // Sampling
    sampleValue ← InterpolateValue(rayPosition);

// //////////////////////////////////////////
    // Skip-to-Threshold VDP
    if !reachedThreshold then
        if sampleValue >= threshold then
            reachedThreshold ← true;
        end
    end
    if reachedThreshold then
        // Transfer function evaluation
        sampleColor ← ColorTransferFunction(value);
        sampleOpacity ← OpacityTransferFunction(value);

// Shading
        sampleGradient ← InterpolateGradient(rayPosition);
        shadedColor ← DoShading(sampleColor, sampleGradient);

// Compositing
        accumulatedColor ← accumulatedColor + shadedColor * sampleOpacity *
        remainingOpacity;
        remainingOpacity ← (1.0 - sampleOpacity) * remainingOpacity;
    end
    // //////////////////////////////////////////
    // Increment position
    rayPosition ← IncrementRayPosition(rayPosition);
end
```

FIG. 21

```
rayPosition ← rayBegin;
accumulatedColor ← (0.0,0.0,0.0);
remainingOpacity ← 1.0;
reachedThreshold ← false;
foundMax ← false;
while rayPosition < rayEnd do
    // Sampling
    sampleValue ← InterpolateValue(rayPosition);
    // ///////////////////////////////////////////
    // First Local Maximum VDP
    if sampleValue >= lowThreshold then
        reachedThreshold = true;
    end
    if reachedThreshold and !foundMax then
        // Going uphill
        if sampleValue > maxValue then
            maxValue ← sampleValue;
            savedPosition ← rayPosition;
        end
        // Going downhill
        else if sampleValue <= maxValue - threshold then
            accumulatedColor ← (0.0,0.0,0.0);
            remainingOpacity ← 1.0;
            rayPosition ← savedPosition;
            foundMax ← true;
            continue;
        end
    end
    // ///////////////////////////////////////////
    // Transfer function evaluation
    sampleColor ← ColorTransferFunction(value);
    sampleOpacity ← OpacityTransferFunction(value);
    // Shading
    sampleGradient ← InterpolateGradient(rayPosition);
    shadedColor ← DoShading(sampleColor, sampleGradient);
    // Compositing
    accumulatedColor ← accumulatedColor + shadedColor * sampleOpacity * remainingOpacity;
    remainingOpacity ← (1.0 - sampleOpacity) * remainingOpacity;
    // Increment position
    rayPosition ← IncrementRayPosition(rayPosition);
end
```

METHODS, SYSTEMS, AND COMPUTER READABLE MEDIA FOR FLEXIBLE OCCLUSION RENDERING

RELATED APPLICATIONS

The presently disclosed subject matter claims the benefit of U.S. Provisional Patent Application Ser. No. 60/919,079, filed Mar. 20, 2007; the disclosure of which is incorporated herein by reference in its entirety.

GOVERNMENT INTEREST

This presently disclosed subject matter was made with U.S. Government support under Grant No. P41 EB002025-21 RS/RMT awarded by the National Institutes of Health. Thus, the U.S. Government has certain rights in the presently disclosed subject matter.

TECHNICAL FIELD

The subject matter described herein relates to rendering images of objects from viewpoints where the subject of the image would normally be occluded. More particularly, the subject matter described herein relates to methods, systems, and computer readable media for flexible occlusion rendering.

BACKGROUND

The goal of flexible occlusion rendering (FOR) is to enable view-dependent rendering of occluded objects in a volume for displaying useful views of MRI and CT data to aid physicians in diagnosis. For example, when using volume rendering to perform virtual arthroscopy from a shoulder MRI, a view of the entire shoulder socket is desired for rapid evaluation of the cartilage surface for defects (FIG. 1). For example, FIG. 1 illustrates a textbook illustration of a shoulder socket. Such a view would be desirable in a real shoulder, but would require rendering from a viewpoint inside the humeral head. However, views from inside the humeral head that would otherwise show the entire socket are not possible, as the cartilage surface of the humeral head occludes the socket (FIG. 3, Camera 1). In FIG. 3, camera 1, indicated by reference number 10, represents a viewpoint inside of the humeral head. Such a view is difficult to achieve using standard rendering techniques because adjusting the volume rendering transfer function to reduce the opacity of the cartilage surface of the humeral head will also reduce the opacity of the cartilage surface of the shoulder socket, making the resulting image very difficult to interpret (FIG. 2). For example, FIG. 2 illustrates an image of a shoulder rendered from MRI data where the cartilage surfaces on the humeral head and in the shoulder socket are rendered with partial transparency. Because the cartilage surface of the shoulder socket is rendered with the same transparency as the cartilage surface of the humeral head, it is difficult to distinguish between the two surfaces in the resulting image, and defects are difficult to evaluate.

Therefore, with standard volume rendering, views of the shoulder socket are limited to those from positions within the fluid-filled joint capsule (FIG. 3, Camera 2, indicated by reference number 12) (reference number 10 and 12 will respectively be used to distinguish between Cameras 1 and 2 in the remaining figures that use such cameras to show different viewpoints). Because of this limitation, the physician must evaluate the socket from viewpoints either at extreme angles or very close to the surface, much like evaluating the surface of the hand with the palm touching the tip of the nose (Clarke, 2004). A method for removing the occluding material of the humeral head, enabling unobstructed views of the shoulder socket, is required. More generally, there exists a need for methods, systems, and computer readable media for flexible occlusion rendering, where images of surfaces can be rendered from arbitrarily selected viewpoints, regardless of the number and type of intervening interfaces between the viewpoint and the surface to be rendered.

SUMMARY

The subject matter described herein includes methods, systems, and computer readable media for flexible occlusion rendering. The subject matter described herein includes methods, systems, and computer readable media for flexible occlusion rendering. Once exemplary method for flexible occlusion rendering includes receiving a first set of three dimensional image data including image data for a surface of interest and image data for a region occluding the surface of interest from a desired viewpoint. The method further includes casting a plurality of rays from the viewpoint to the surface of interest. The method further includes, along each ray, identifying a local maximum in voxel intensity, and, rendering voxels on one side of the local maximum in voxel intensity to be visible and rendering voxels on a near side of the local maximum in voxel intensity to be at least partially transparent, wherein the voxels rendered as visible define the surface of interest and the voxels rendered to be at least partially transparent define the region occluding the surface of interest. The method further includes displaying the voxels rendered along each ray to a user so that the user can view the surface of interest through the occluding region.

The subject matter described herein for flexible occlusion rendering may be implemented using a computer readable medium having stored thereon computer executable instructions that when executed by the processor of a computer perform steps. Exemplary computer readable media suitable for implementing the subject matter described herein include chip memory devices, disk memory devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Embodiments of the subject matter described herein will now be explained with reference to the accompanying drawings, of which:

FIG. 11 is a source code example illustrating fixed threshold VDM with a standard volume rendering implementation.

FIG. 21 is a source code listing for skip-to-threshold VDP.

In FIG. 22 a), hole artifacts due to the threshold not being reached are circled. In FIG. 22 b), eroded areas of the surface due to an inaccurate definition in the transfer function are circled.

FIG. 24 is a source code listing for first local maximum VDP.

In FIG. 25, the lowermost dotted line represents the threshold above which the maximum must lie for consideration as a local maximum, and the second highest dotted line represents the distance down from the peak that a threshold must lie for consideration a local maximum.

In FIG. 26 a), fixed threshold VDP is used, and the dark areas represent holes. In FIG. 26 b), first local maximum VDP is used to determine the intensity peak along the ray and to fill the holes. In FIG. 26 b), an area with a low gradient is circled.

In FIG. 27 a), the artifacts occur at the intensity peak along each ray. In FIG. 27 b), a gradient opacity transfer function is used to reduce the artifacts.

DETAILED DESCRIPTION

The Desired System

What is desired is a system that requires minimal supervised preprocessing of the data, does not suffer from segmentation artifacts, is robust in areas where segmentation of objects is difficult, handles self-occlusion, enables view-dependent determination of the object of interest, and correctly handles transitions from occluded viewpoints to unoccluded viewpoints.

Potential Solutions

Clipping Plane

One potential solution for removing the occluding material of the humeral head is to apply a clipping plane. A clipping plane removes all occluding material between the viewpoint and the plane. The plane can either be placed at a certain distance in front of the viewpoint, or at a predefined position and orientation in the volume. There are two major drawbacks to using a clipping plane for removing the occluding material.

The first drawback is that the clipping plane must be continually redefined by the user when moving the viewpoint. For a clipping plane placed a certain distance in front of the viewpoint, this distance must be adjusted based on the distance from the camera to the shoulder socket. For a clipping plane at a predefined position and orientation in the volume, the position and orientation must be adjusted to give the best effect depending on the viewpoint.

Figure 4:
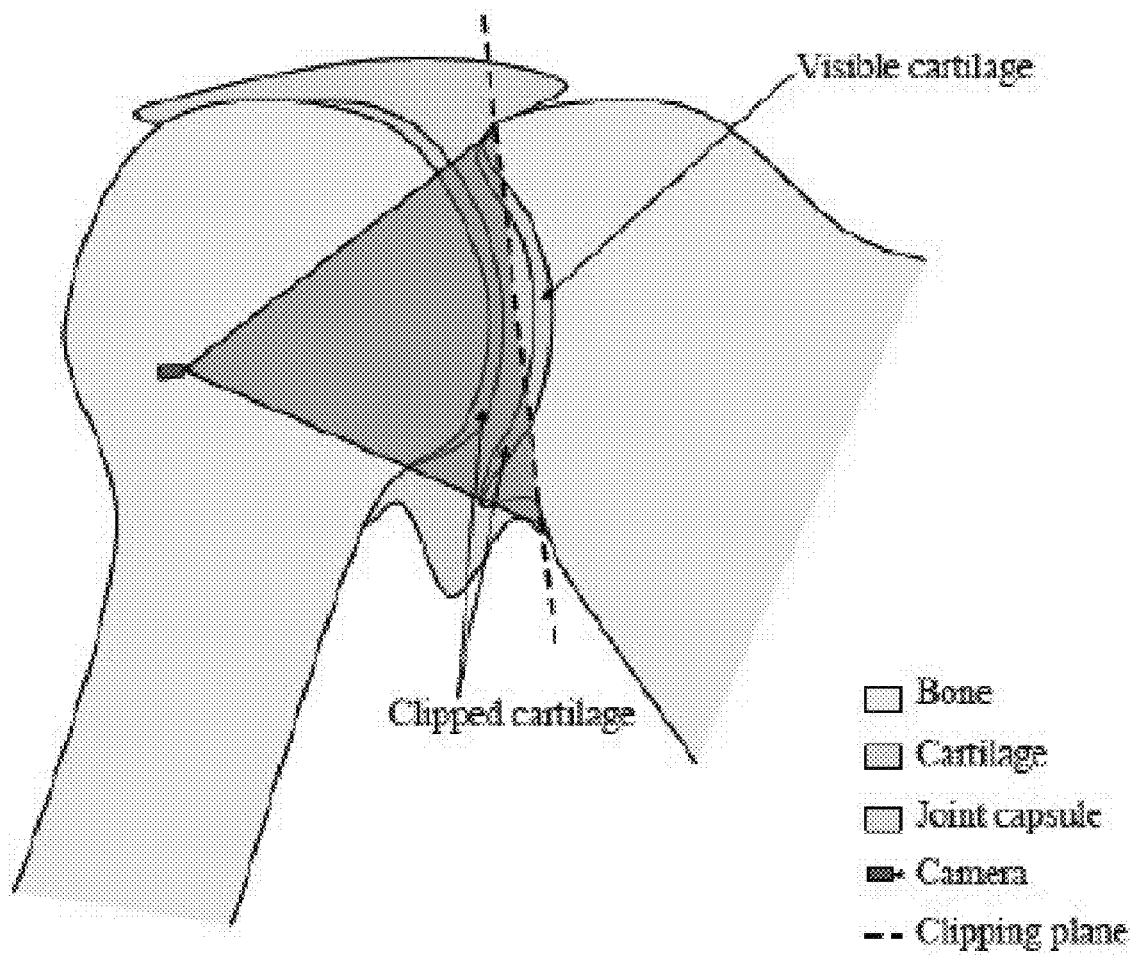
FIG. 4 is a diagram of a shoulder socket illustrating that no clipping plane will show the entire socket.

The more fundamental drawback of the clipping plane approach is that, due to the geometry of the ball-and-socket joint, no single clipping plane is sufficient to render the entire socket (FIG. 4). This drawback is not specific to the shoulder, as many joints and other anatomical features of interest have even more complex geometries than that of the shoulder. FOR essentially implements an arbitrarily-shaped, data-dependent clipping surface, thus removing this limitation.

Segmentation

Another possible solution for removing the occluding material of the humeral head is to pre-segment the volume. Segmentation is the partitioning of the volume into multiple regions corresponding to objects in the volume. Accurate segmentation of the humeral head can enable its removal from the volume.

One way to perform segmentation is to manually segment the region of interest (ROI). Manual segmentation is an extremely time-consuming and tedious task, requiring the physician to draw ROIs on each slice of the volume. With the large number of medical data sets generated daily, the time taken to perform such a segmentation is prohibitive (Clarke, 2004).

Various automatic segmentation algorithms also exist. Voxel-based segmentation methods, such as thresholding, attempt to classify each voxel into a tissue-type based on voxel intensities. Other methods incorporate different metrics, such as texture. After voxel classification, region-growing techniques can be performed to group the volume into objects. Model-based methods, such as active contour models (ACM), also referred to as snakes, active shape models (ASM), and active appearance models (AAM), deform an object boundary to fit the image data (Kass et al., 1988; Cootes and Taylor, 1998; Cootes et al., 1992). Level set methods are similar to ACM, but model the evolving boundary implicitly as a higher-dimensional surface (Osher and Sethian, 1988; Sethian, 1996).

Figure 5:
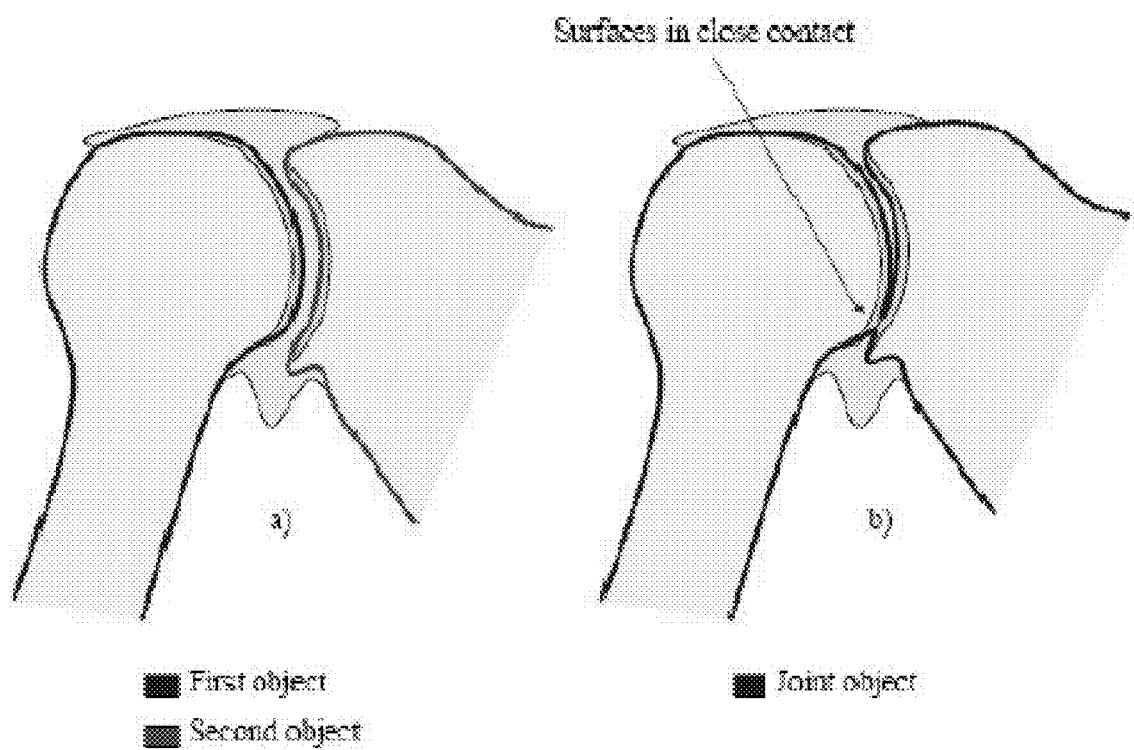
FIGS. 5 *a*) and 5 *b*) are diagrams of a shoulder wherein FIG. 5 *a*) illustrates that a good separation between surfaces results in separate objects being treated separately during rendering and FIG. 5 b) illustrates that surfaces in close contact can be treated as a single object during rendering.

Automatic segmentation methods can be computationally expensive for large volumes and often require fine tuning of parameters. Obtaining a good segmentation might therefore require a few user-guided iterations, and may still require some manual modification. Most automatic segmentation techniques require numerous pre-segmented data sets to learn from to aid in classification, so these training data sets must be created manually. Additionally, for the purposes of object removal, an error in the segmentation that joins two objects together results in either both objects being shown, or neither. This problem can arise with the humeral head and shoulder socket when there is not good separation between the two surfaces (FIG. 5).

Assuming a good segmentation, simply removing the humeral head is still problematic for a virtual arthroscopy application. During the same analysis, it is often desirable to view the socket from positions within the humeral head, and to view the humeral head from within the scapula. To do so with segmentation would require an accurate segmentation of both the humerus and the scapula, and a means to determine which to view each frame of the rendering.

Figure 6:
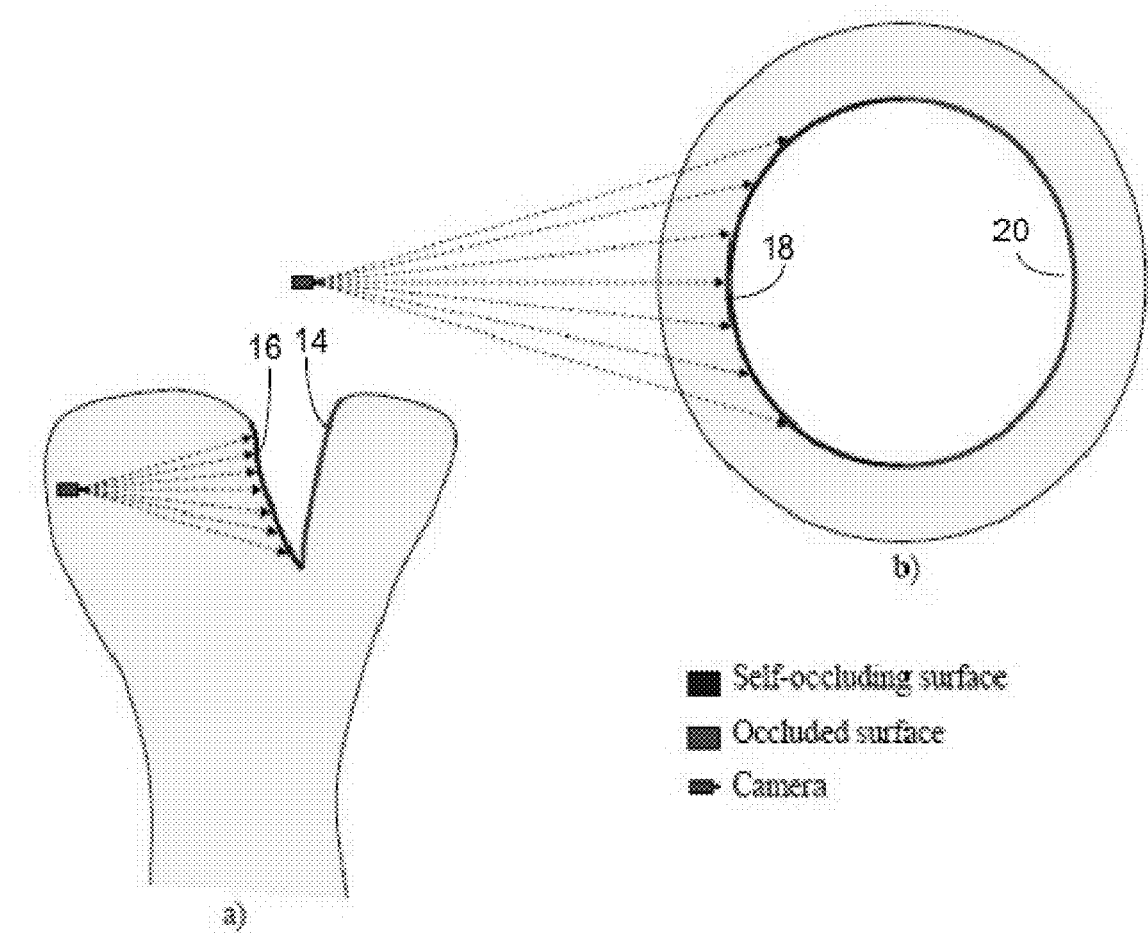
FIGS. 6 a) and 6 b) are diagrams of a bone illustrating two examples of self occlusion.

For certain geometries, even a perfect segmentation does not enable view-dependent display of objects of interest. For any non-convex surface, there are views from which the surface will occlude itself (FIG. 6 $a$)). For example, in FIG. 6 $a$), surface 14 is occluded by surface 16. These irregular surfaces occur in locations such as bone fractures and folded surfaces. Similarly, no segmentation is able to render the interior surfaces of objects from arbitrary viewpoints outside the object (FIG. 6($b$)). In FIG. 6 $b$), surface 18 occludes surface 20. Our collaborators want to view the interior of the ureters and renal collecting systems from exterior positions in a virtual ureteroscopy application.

Isosurfaces

The other potential solution for removing the occluding material of the humeral head involves defining an isosurface at the correct isovalue to represent the surfaces of interest. Any isosurface approach will inherit the issues with surface-based rendering, as well as problems with surfaces occluding each other.

Figure 7:
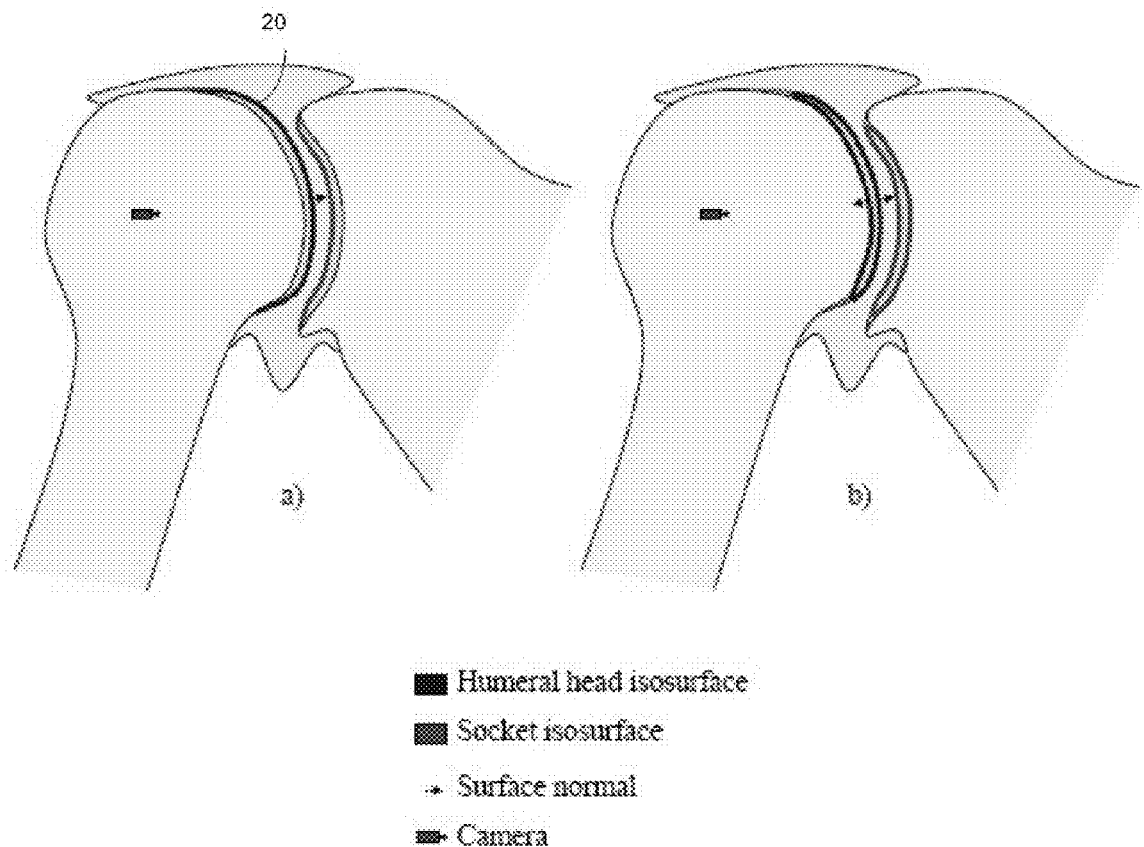
FIGS. 7 a) and 7 b) are diagrams of a shoulder illustrating, in FIG. 7(a) a situation where backface culling works because the normal for the humeral head isosurface points away from the camera and in FIG. 7 b) a situation where backface culling does not work because portions of the humeral head isosurface point towards the camera.

A potential solution to the occlusion problem is to use back-face culling. If the isosurfaces are rendered using back-face culling, polygons that face away from the viewpoint are not rendered. Mathematically, if the polygon normal is N and the vector from the viewpoint to the polygon is V, the polygon is culled if $N \cdot V > 0$. This approach will work for rendering the interior of ureter surfaces, however there are common configurations in which backface culling is insufficient. In FIG. 7 $a$), backface culling works, as the surface normals of humeral head isosurface 20 point away from the camera. However, FIG. 7($b$) shows a configuration that can also arise with MRI or CT data. In this case, simple back-face culling does not remove the entire surface of the humeral head, as there are front-facing polygons of the humeral head between the viewpoint and the socket.

To remove the front-facing polygons of the humeral head isosurface, depth peeling can be used. Depth peeling is a framebuffer-based technique that can achieve order-independent transparency when rendering polygons (Mammen, 1989; Diefenbach, 1996; Everitt, 2002). From viewpoints within the humeral head, setting the first depth layer of polygons to fully transparent renders the humeral head isosurface fully transparent, revealing the shoulder socket surface. However, this technique will require the user to enable and disable depth peeling when maneuvering into and out of the joint capsule, as the shoulder socket isosurface is made transparent when the humeral head isosurface does not occlude it. FOR enables moving seamlessly between the humeral head and the joint capsule, which is common when performing surveys of the socket and then inspecting areas of interest more closely.

Volumetric Depth Peeling

Figure 8:
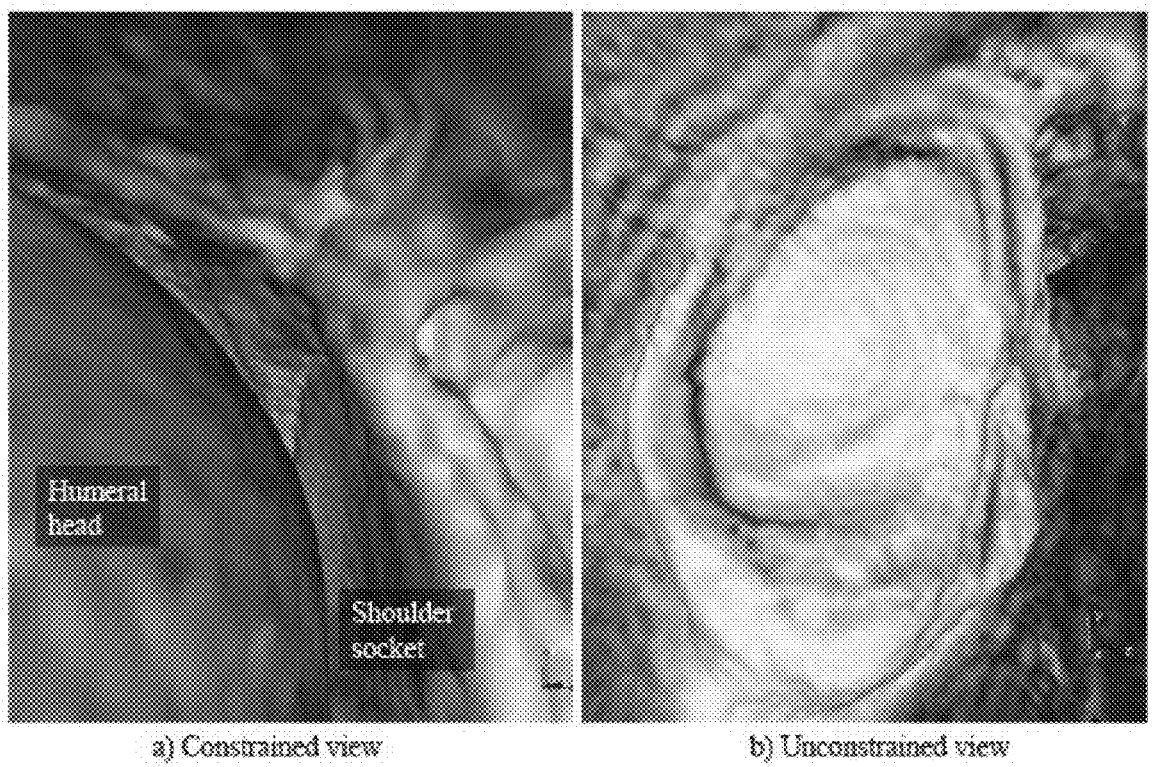
FIGS. 8 a) and 8 b) are volume rendering of a shoulder where FIG. 8 a) illustrates a volume rendering of a shoulder from MRI data that is constrained to viewpoints within the fluid-filled joint capsule between the humeral head and the shoulder socket and where FIG. 8 b) illustrates a rendering of a shoulder using volumetric depth peeling (VDP) that enables survey views of the entire socket by automatically removing the occluding material of the humeral head.
Figure 9:
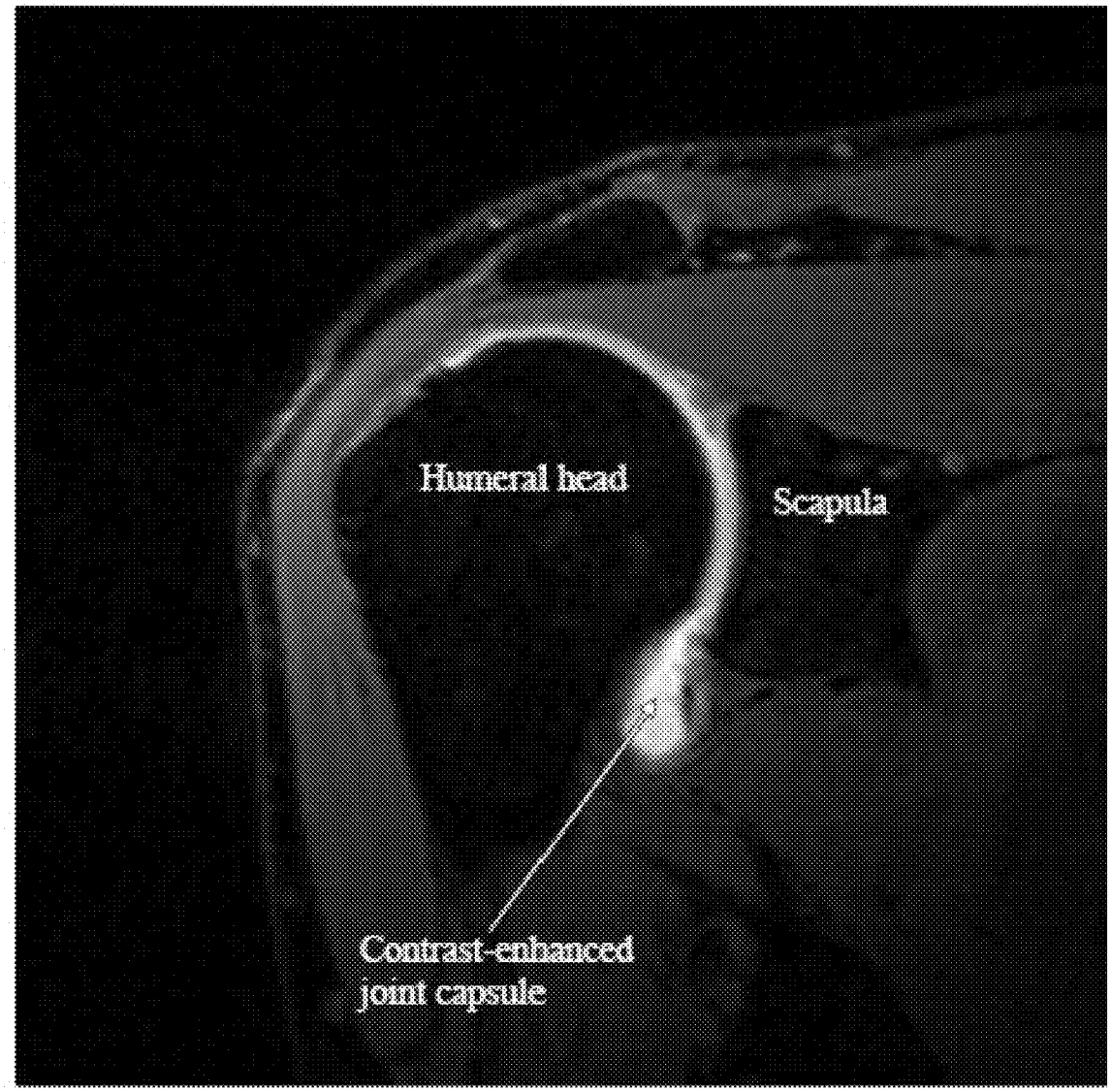
FIG. 9 is a coronal slice of a shoulder MRI where the bright fluid filled capsule defines the space between the humeral head and the shoulder socket.

Volumetric depth peeling (VDP) is the simplest implementation of FOR. It shares its name with (Nagy and Klein, 2003), which involves texture-based isosurface rendering with depth peeling. However, the implementation of VDP described here is extended to the more general case of ray-based volume rendering. It retains full transfer function control, enabling the full range of volumetric effects to be applied, including effects that simulate directionally illuminated surface rendering. VDP is an extension to standard ray-cast volume rendering that resets accumulated color and opacity along each ray when features in the volume indicating a separation between occluding objects is found. FIG. 8 shows a standard volume rendering of a shoulder joint compared with a rendering using VDP. With the shoulder joint example, an MRI image displays the bright fluid-filled joint capsule defining the space between the humeral head and the shoulder socket (FIG. 9). In standard MRI joint trauma diagnosis, a fluid called a contrast agent is often injected into the joint capsule to give a brighter signal and increase the separation between joint surfaces. Gadolinium-based contrast agents are commonly used. Most of the MRI data sets used in the examples described herein include such contrast enhancement; however, the term fluid will be used instead of contrast agent to retain generality.

VDP works by determining when each ray encounters the fluid-filled joint capsule, resetting the accumulated color and remaining opacity the first time it is encountered. The effect of resetting the accumulated color and remaining opacity is to clip away all of the occluding material between the viewpoint and the far side of the joint capsule. The simplest method to determine when the separating fluid is encountered is a fixed-value threshold.

Fixed-Threshold Method
Algorithm

Figure 10:
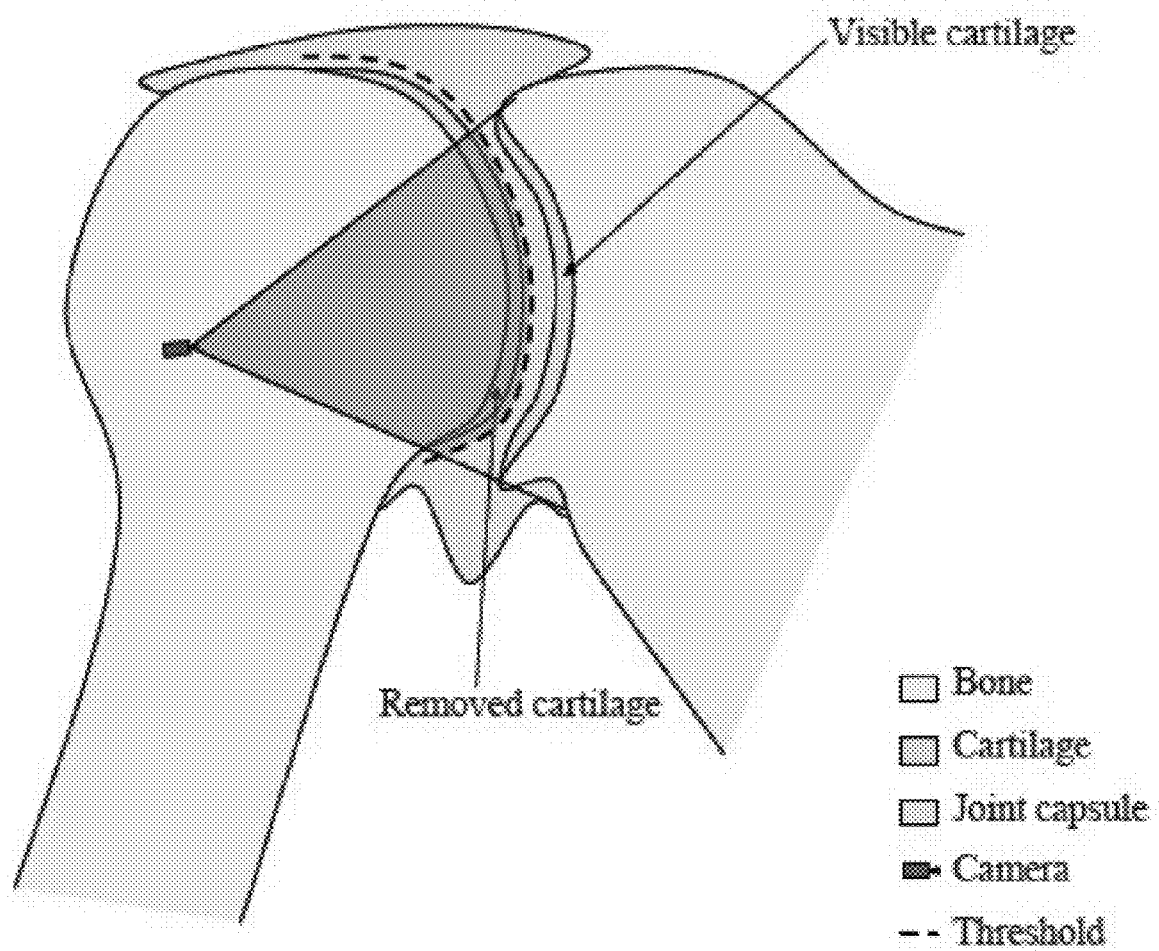
FIG. 10 is a diagram of a shoulder slice illustrating that with VDP, the accumulated color and remaining opacity between the viewpoint and the threshold are reset, making the entire socket visible.

In standard ray-cast volume rendering, a ray is cast into the volume for each pixel in the rendered image. As the ray traverses the volume, it accumulates color and opacity based on the volume rendering transfer function. For VDP with a fixed threshold, the threshold is set to a value above which represents fluid in the MRI image. When traversing each ray, the first time the current data value is greater than or equal to the threshold, the accumulated color and remaining opacity are reset. This removes the occluding material, making the shoulder socket visible (FIG. 10). Pseudocode for this algorithm is given in FIG. 11.

Figure 12:
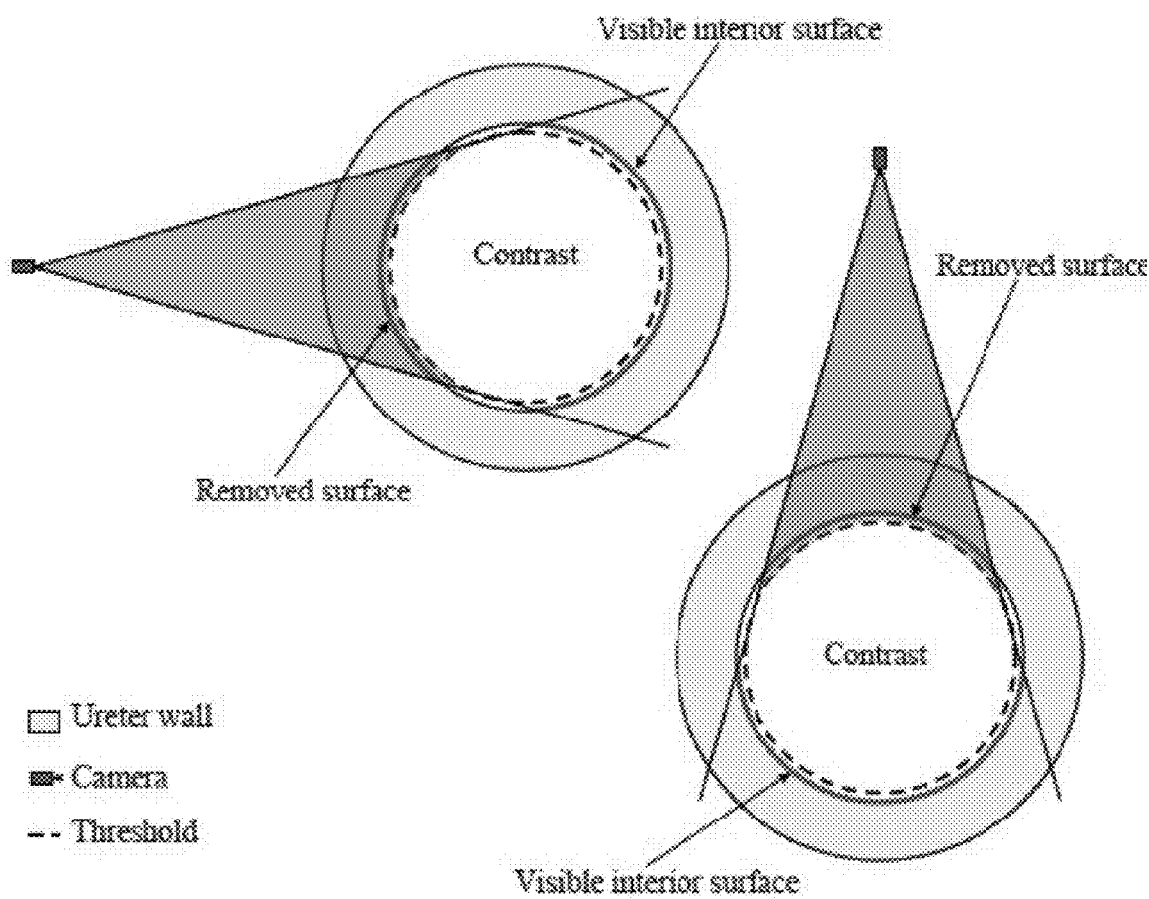
FIG. 12 is a diagram of tube structures illustrating that, using VDP, the far interior surface is visible from any angle.

In addition to the case of separate objects occluding each other, the fixed-threshold VDP algorithm works for self-occluding surfaces. For example, in virtual ureteroscopy of CT data a high-density contrast agent is introduced within the ureters and renal collecting systems to aid in visualizing their interior surfaces for small tumors and stones. It is desirable to enable views of the interior surfaces of the renal collecting system from exterior viewpoints to obtain survey views. The same fixed-threshold VDP method will work in this case, as shown in FIG. 12.

Selecting the Threshold

Figure 1:
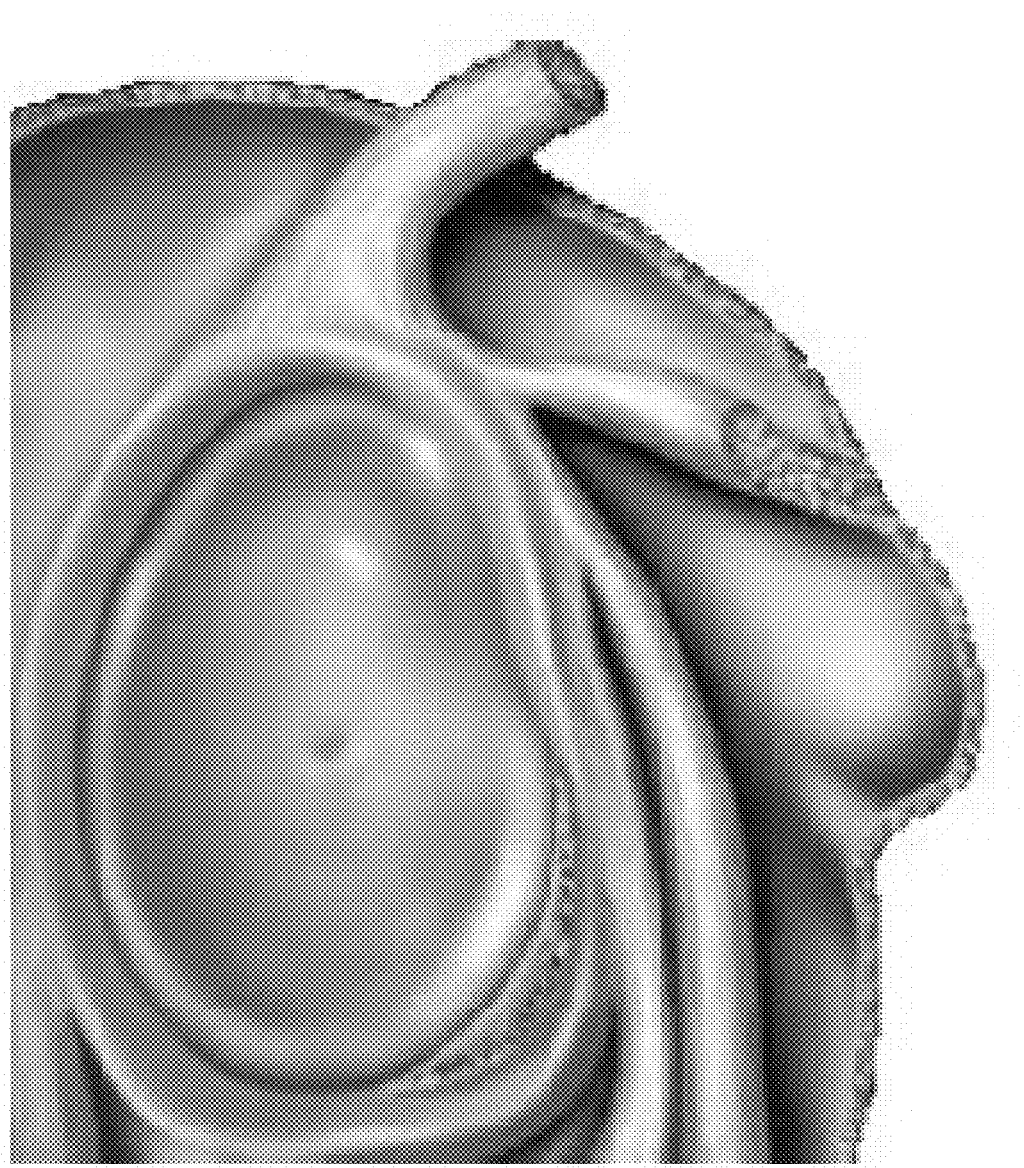
FIG. 1 is a textbook illustration of a shoulder socket (Stroller et al., 2004). In a real shoulder, the viewpoint would be occluded by the humeral head.
Figure 2:
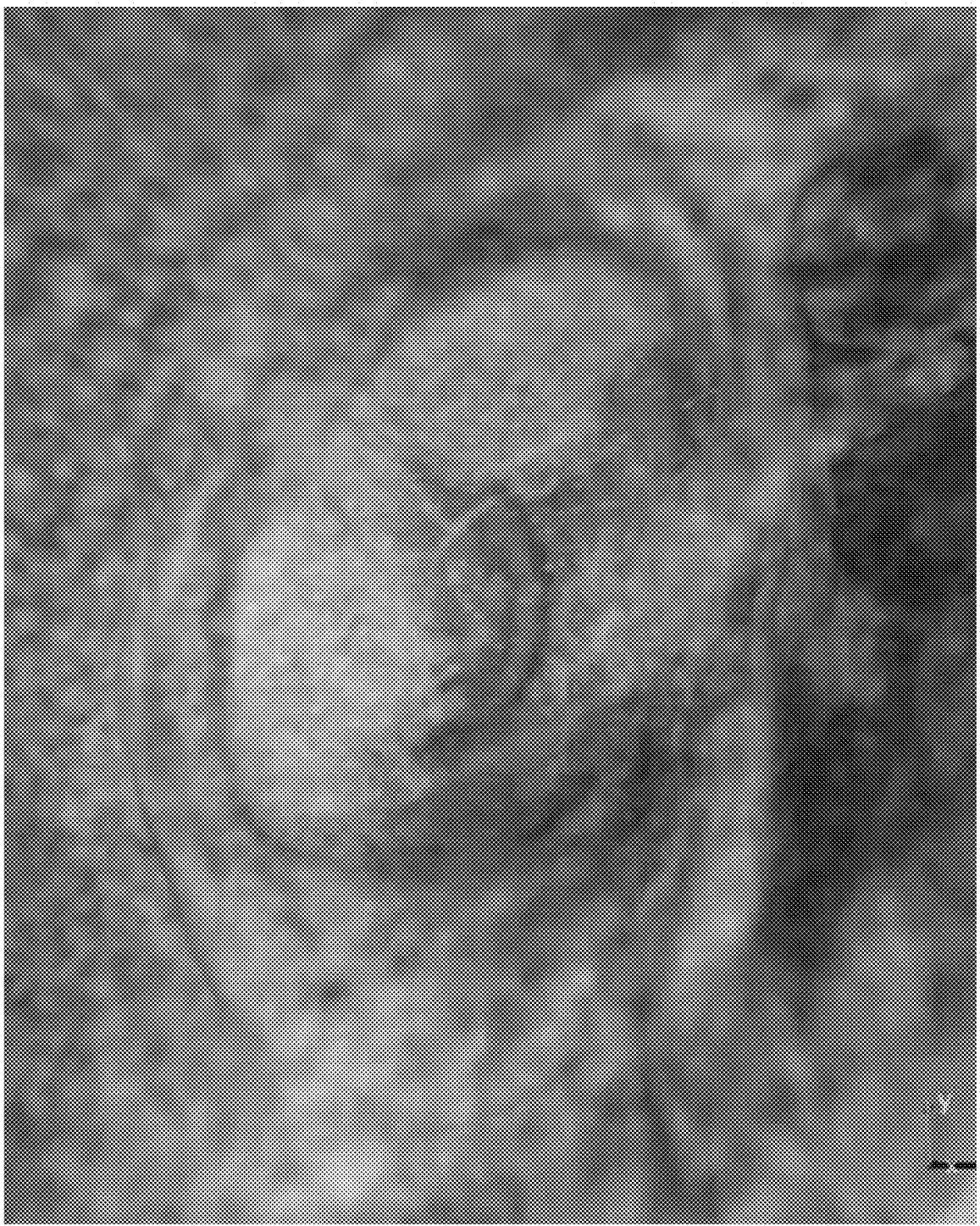
FIG. 2 is an image of a shoulder rendered from MRI data. Rendering the cartilage surfaces with partial transparency results in a confusing image.
Figure 3:
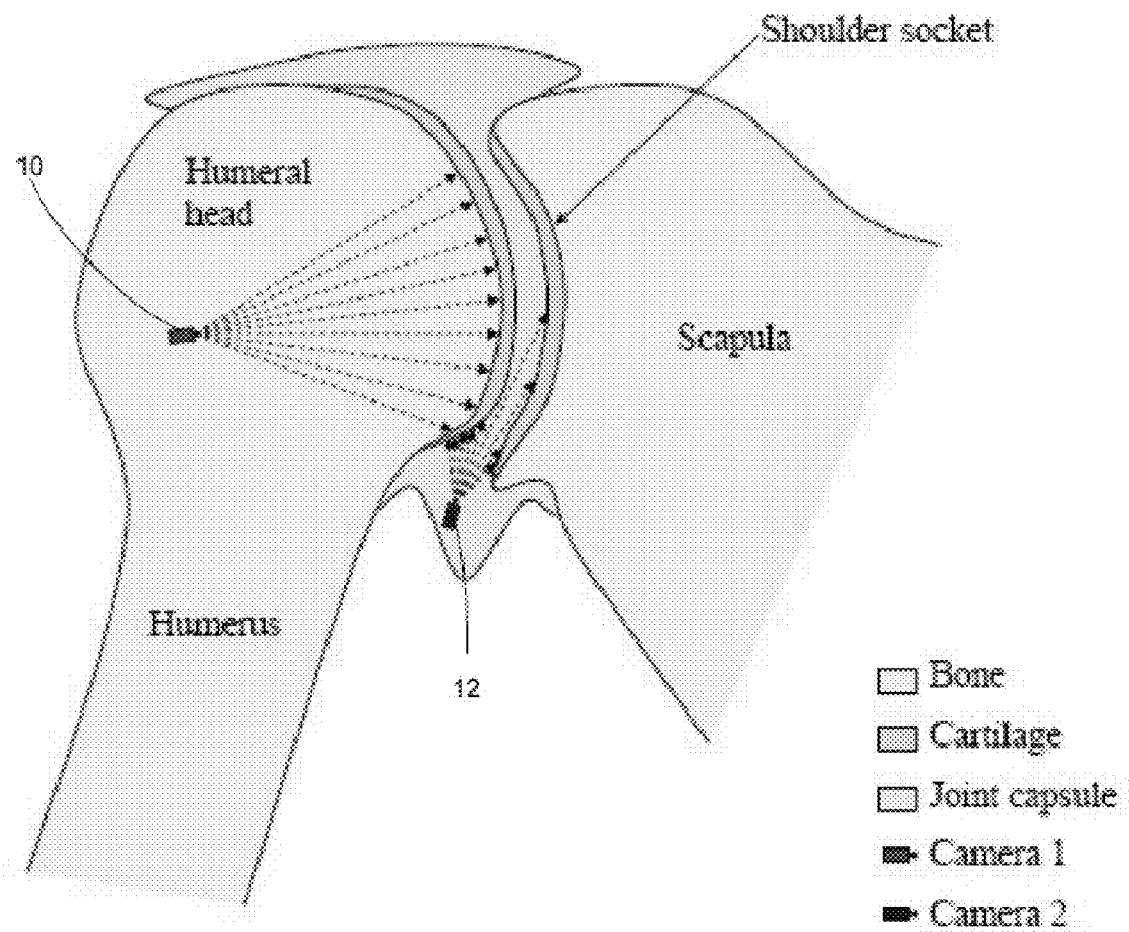
FIG. 3 is a shoulder diagram, coronal slice. The cartilage surface of the humeral head occluded the shoulder socket from viewpoints within the humeral head, and viewpoints within the joint capsule, giving limited view of the shoulder socket.
Figure 13:
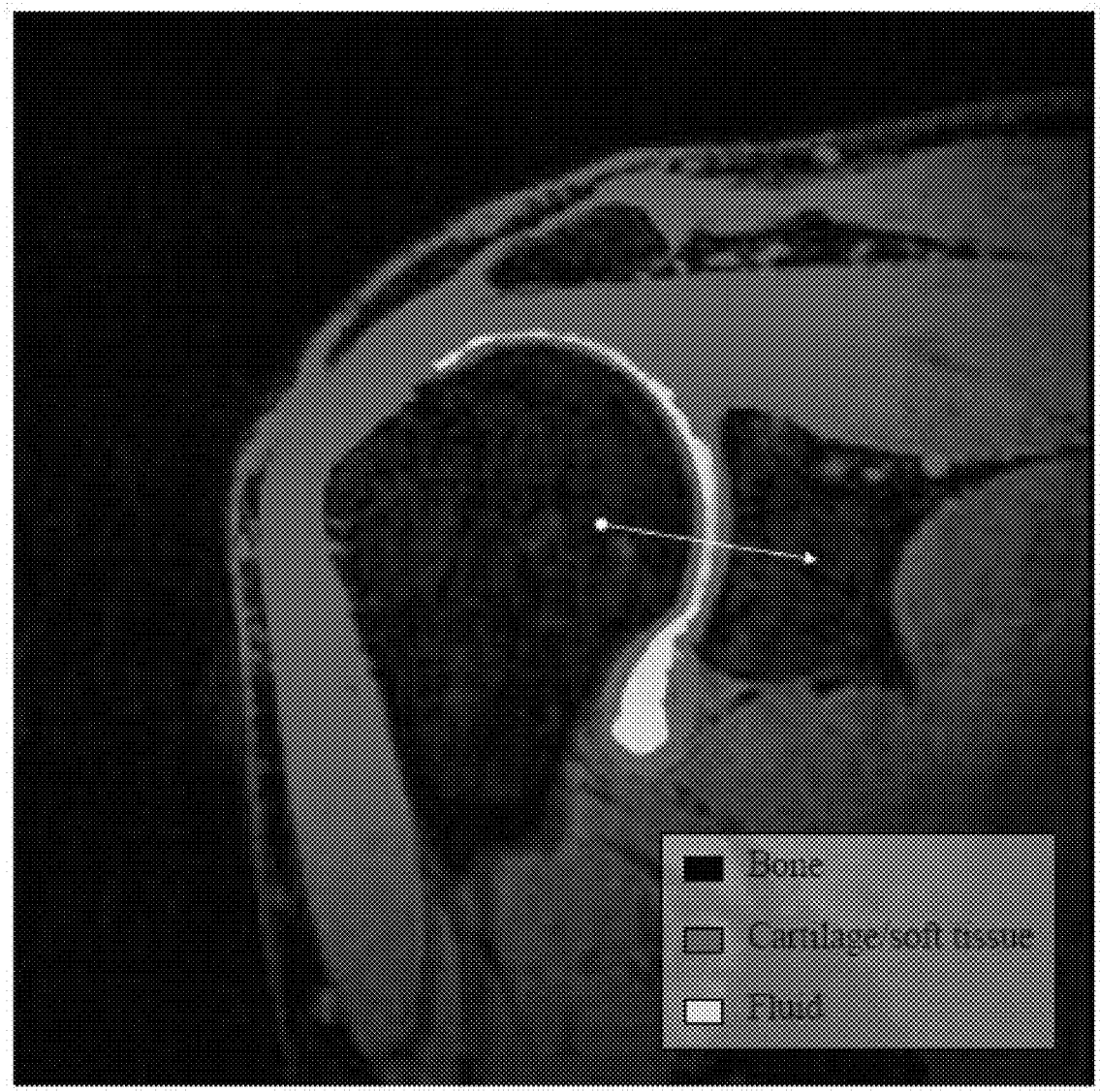
FIG. 13 is a shoulder MRI illustrating that with the blackbody radiation color map and an appropriate window/level applied, the tissue types are easier to distinguish visually.
Figure 14:
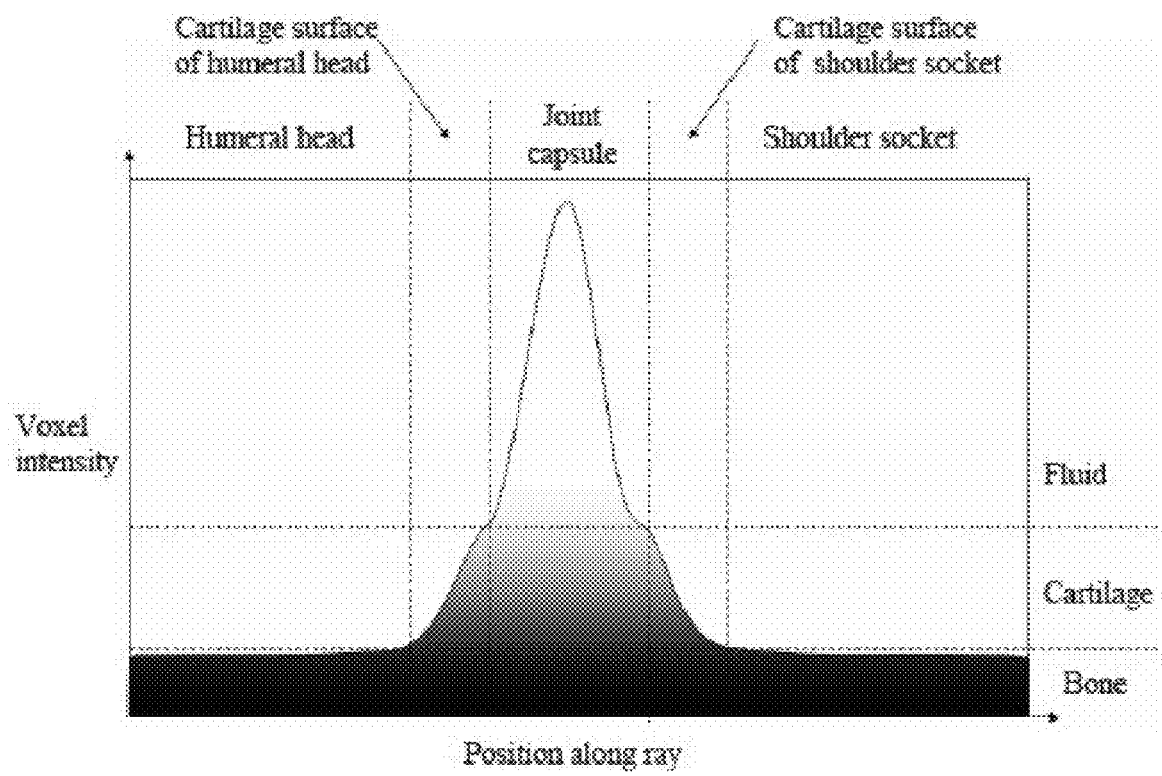
FIG. 14 is a graph illustrating an idealized MRI intensity profile of a ray starting in the humeral head, passing through the joint capsule, and ending in the scapula.
Figure 15:
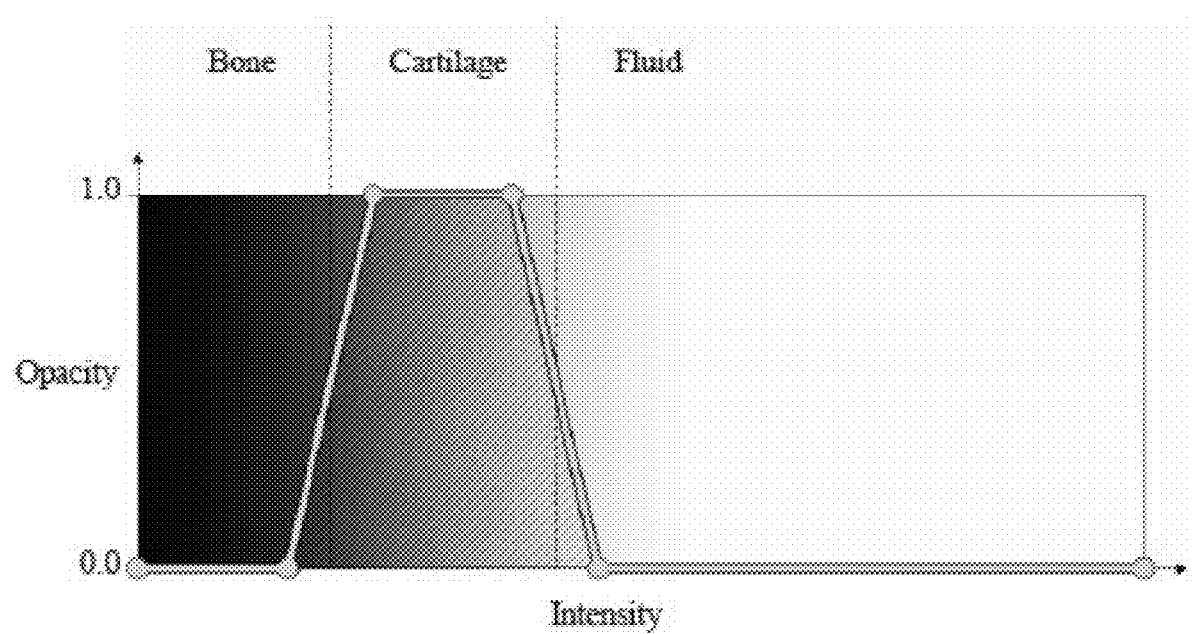
FIG. 15 is a diagram illustrating a typical scalar opacity transfer function used to display cartilage surfaces.

FIG. 13 shows the same MRI image shown in FIG. 9, but with a black-body radiation color map and an appropriate window/level applied to aid in distinguishing bone, cartilage/soft tissue, and fluid. A diagram of an idealized intensity profile along a ray such as the one indicated in FIG. 13, starting in the humeral head, passing through the joint capsule, and ending in the scapula, is shown in FIG. 1 The indicated tissue-type boundaries are approximate, so samples at the boundaries should be weighted less than samples well within the tissue boundaries when rendering. Therefore, to render the cartilage surface using volume rendering, a ramped scalar opacity transfer function is used (FIG. 15). Such a transfer function gives full opacity to samples that are well within the range of cartilage values, and increasingly less opacity to samples as their value moves away from the central region of the range of cartilage values.

Figure 16:
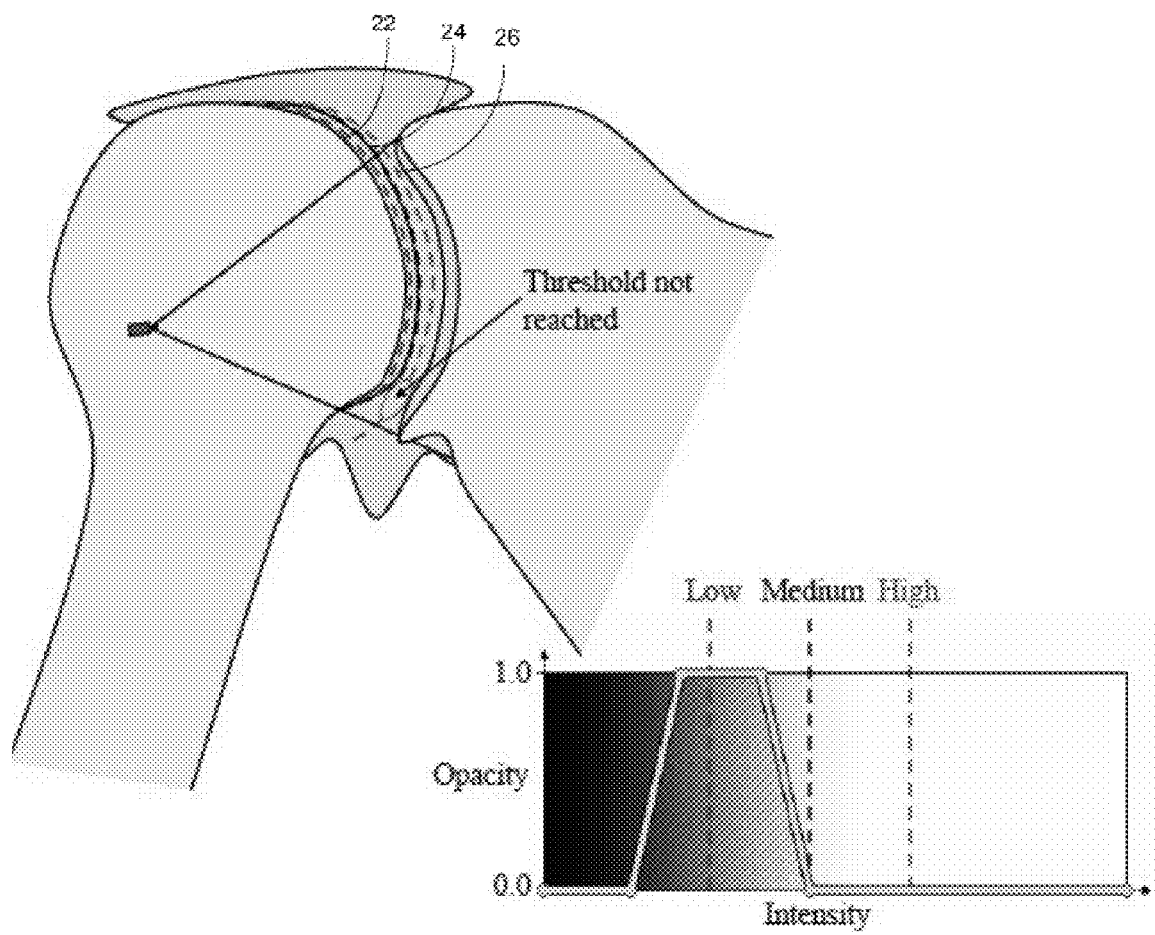
FIG. 16 is a diagram of a shoulder and an opacity transfer function where a low threshold results in the cartilage surface of the humeral head being rendered. A medium threshold reveals the shoulder socket. A high threshold is not reached along all rays.
Figure 17:
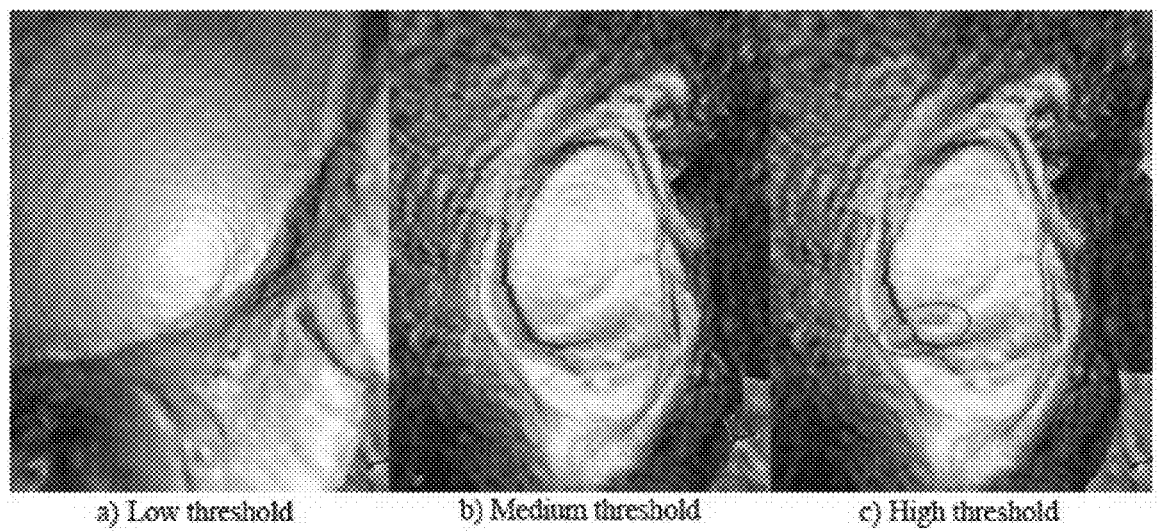
FIGS. 17 a)-17 c) are VDP renderings of shoulders from MRI data, where FIG. 17 a) is a rendering using a low threshold that results in the near side of the cartilage surface of the humeral head being rendered, FIG. 17 b) is a rendering using a medium threshold that results in a good rendering of the shoulder socket, and FIG. 17 c) is a rendering using a high threshold that results in artifacts, which are circles, due to the threshold not being reached.

The VDP threshold for resetting can be set independently from the transfer function settings. FIG. 16 shows a diagram of three different thresholds. The low threshold is set within the range of cartilage values, the medium threshold is set to the maximum cartilage value, and the high value is set above the range of cartilage values. In the shoulder drawing in FIG. 16, dashed lines 22, 24, and 26 respectively correspond to the low medium and high thresholds. The low threshold resets too early, causing part of the cartilage surface of the humeral head to be rendered. The medium threshold resets when exiting the cartilage surface of the humeral head, exposing the socket. The high threshold also exposes the surface of the socket, but along some rays the threshold is not reached. VDP renderings from the same viewpoint with different thresholds are shown in FIG. 17. The circled artifacts circled are caused by the threshold not being reached along some rays, due to lower concentrations of fluid where the cartilage surfaces are close together or touching. Because the threshold is not reached, the near cartilage surface of the humeral head is rendered in these locations. The optimal setting for the threshold is therefore at the maximum value representing cartilage in the transfer function. Such a setting ensures that the ray has exited the cartilage surface of the humeral head, while introducing as few artifacts as possible. Note that the fixed-threshold VDP technique differs from depth and opacity peeling techniques in that it correctly renders the first surface encountered from viewpoints within the joint capsule.

Extensions

Figure 18:
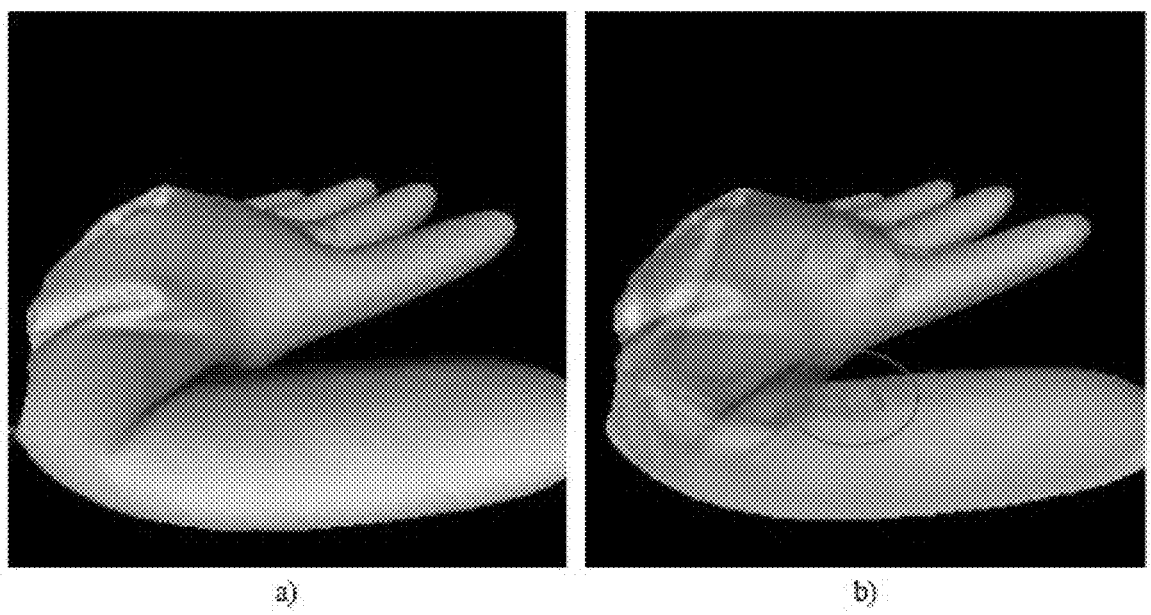
FIGS. 18 a) and 18 b) are VDP renderings of a contrastfilled rubber glove used as a medical phantom in a virtual uteroscopy study, where FIG. 18 a) illustrates a rendering where the outer surface is rendered with full opacity and as with standard volume rendering and where FIG. 18 b) illustrates a rendering whether outer surface is rendered with a modulated opacity to achieve a transparency effect. The small mass circled in FIG. 18(b) is an example of a structure that can be seen on the inner surface of the glove due to the modulated opacity used to render the outer surface of the glove.

Various extensions to the basic fixed-threshold VDP method are possible. One such extension is to modulate the accumulated color and opacity when reaching the threshold, instead of resetting. Doing so can achieve a transparency effect for the near surface, rendering the far surface fully opaque although both surfaces are the same material. FIG. 18 shows two renderings of a contrast-filled rubber glove used as a medical phantom in a virtual ureteroscopy study. FIG. 18 *a*) displays the exterior surface of the glove using standard volume rendering. FIG. 18 *b*) enables VDP to display the inner surface of the glove, but modulates the accumulated color and opacity of the outer surface instead of resetting. Different color transfer functions are also used for the outer and inner surfaces, although they are the same material.

Figure 19:
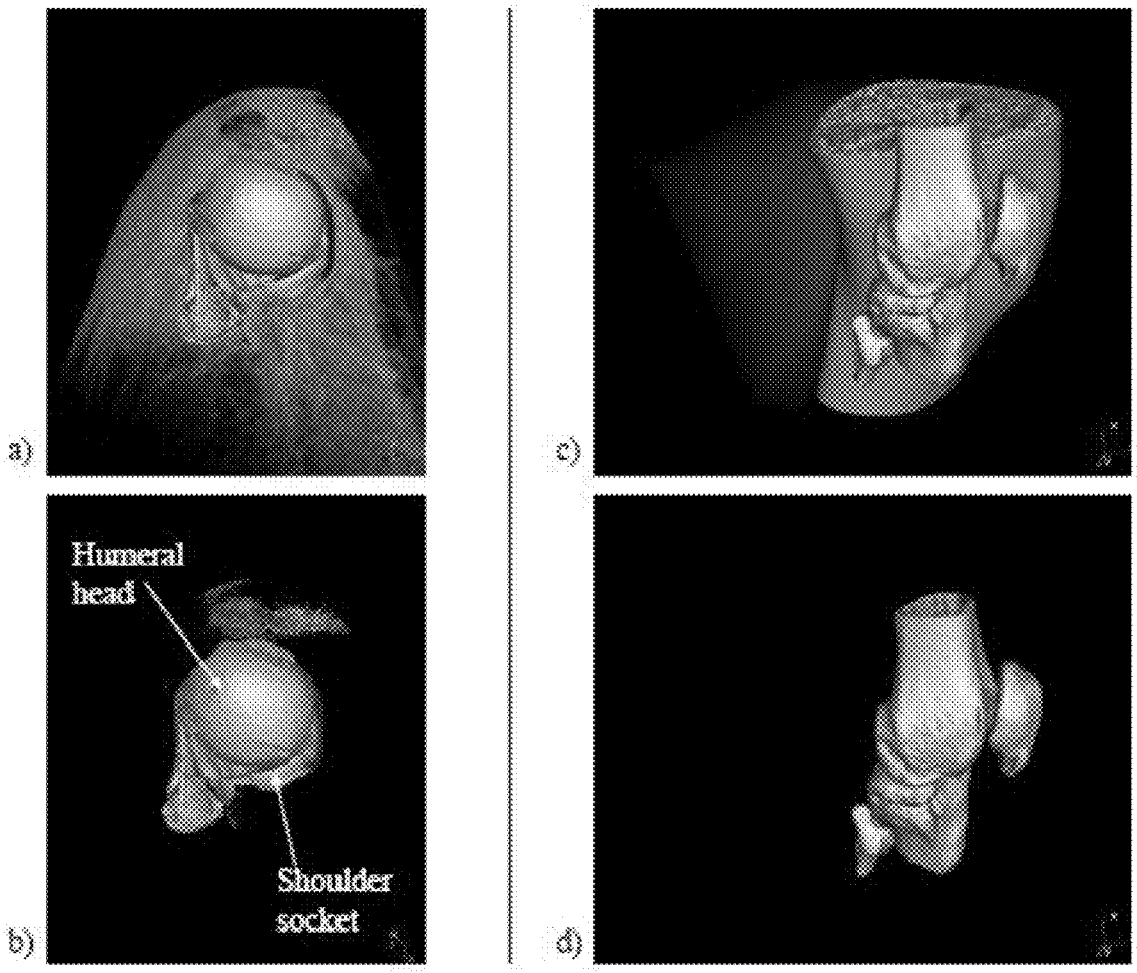
FIGS. 19 a) and 19 b) are top down views of a shoulder rendered from MRI data, and FIGS. 19 c) and 19 d) are views of a knee rendered from CT data. Rays that do not reach the threshold can be rendered as with normal volume rendering, as illustrated in FIGS. 19 a) and 19 d), to provide context, or set to black, as in FIGS. 19 b) and 19 d), to remove distraction.
Figure 20:
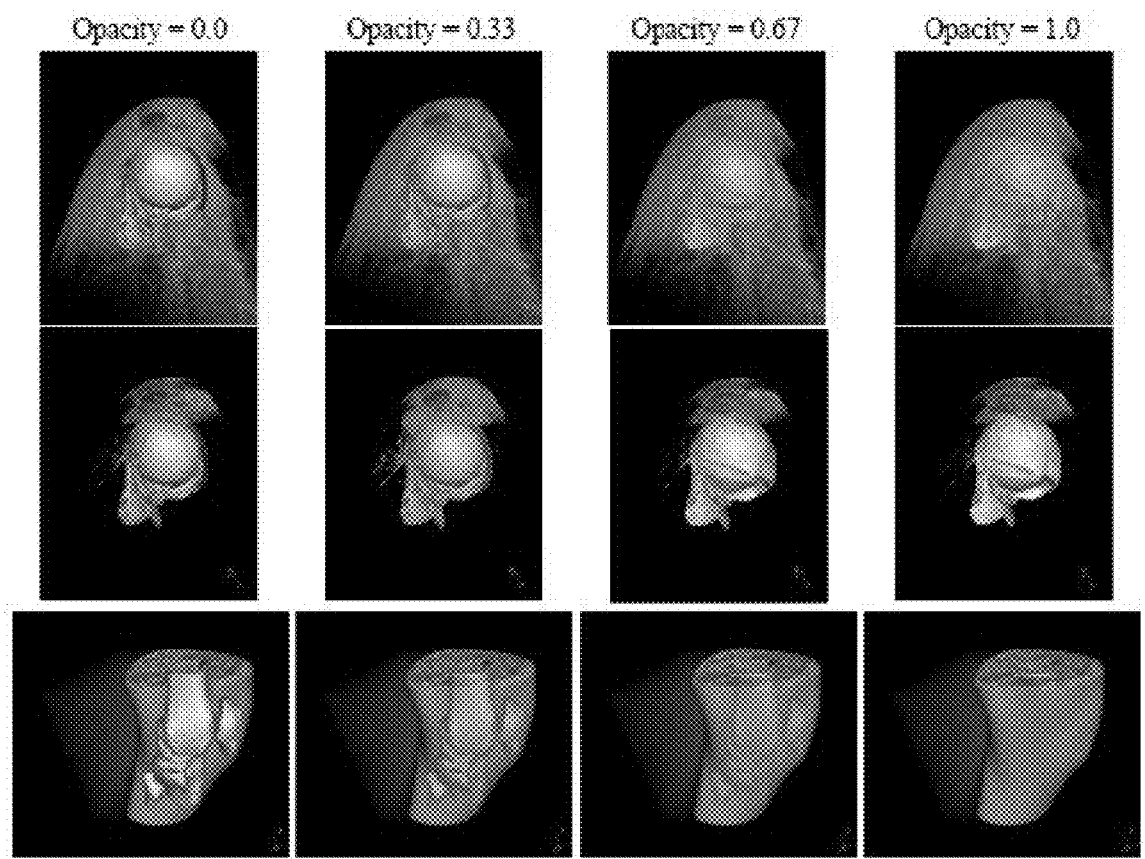
FIG. 20 illustrates views of a knee and a shoulder where accumulated color and opacity modulation are combined with display of rays that do not reach the threshold. The first row in FIG. 20 shows increasing opacity for a top-down view of a shoulder rendered from MRI data. The second row shows the same shoulder rendered with a different transfer function applied to render the outer surface of the joint capsule. The third row shows a knee rendered from CT data. In all cases, full opacity has the same effect as not performing VDP.

Another choice when rendering is what to do along rays that do not reach the threshold. Depending on the application, these rays can either be rendered as with normal volume rendering to provide context, or set to the background color to remove distraction (FIG. 19). One problem with rendering the rays that do not reach the threshold is that a lack of occlusion cues for determining the relative depths of objects can lead to confusion. However, using opacity modulation helps alleviate this problem (FIG. 20). In this manner, VDP can achieve effects similar to importance-driven volume rendering (Viola et al., 2004) without requiring pre-segmentation. Only simple blended transparency is currently implemented, however.

Such focus-and-context techniques are possible with VDP to enable survey views of the data. However, the most useful form of VDP for the applications described herein is to only render rays that reach the threshold, and to remove all of the accumulated color and opacity when reaching the threshold. In this case, only the data on the far side of the threshold will contribute to the final image. A performance increase over the standard VDP algorithm is therefore enabled by only accumulating color and opacity when the threshold has been reached. Pseudocode for this variant of VDP is given in FIG. 21. Most of the remaining images described herein employ some sort of skipping technique, modified for the particular FOR algorithm used.

For the applications described herein, finding the first separating feature has proven useful, however finding multiple separations or the last separation is also possible, depending on the application.

The extensions described above for fixed-threshold VDP can be applied to all variants of FOR presented herein.

Limitations

Figure 22:
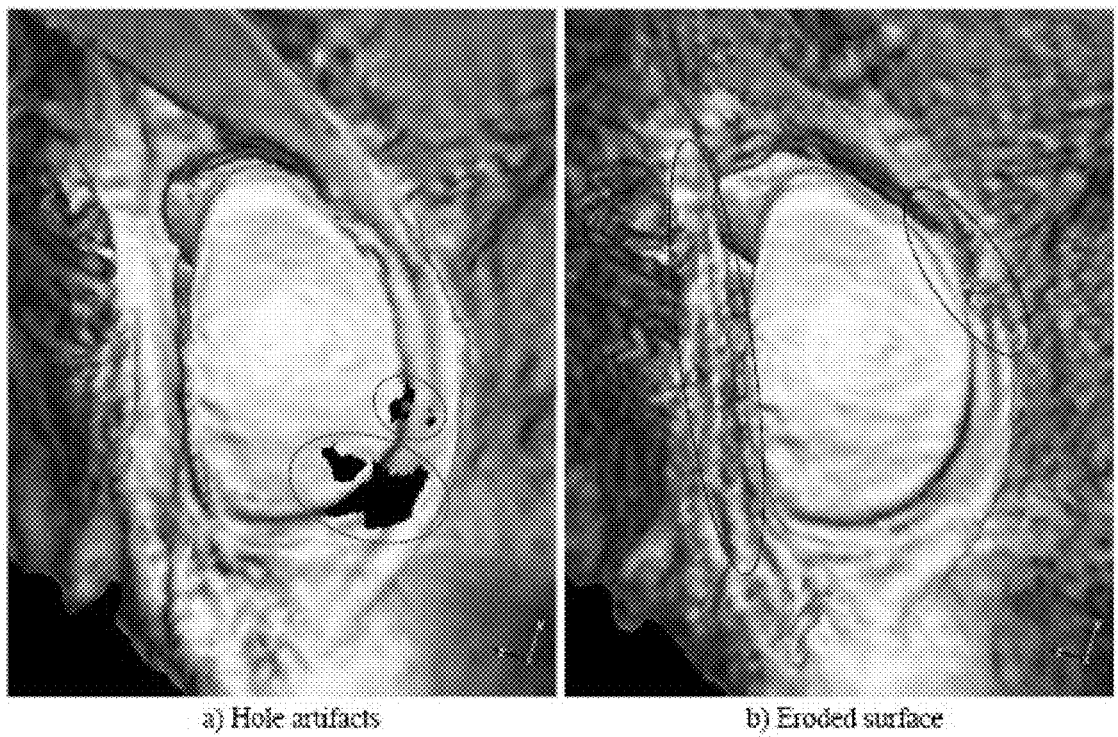
FIGS. 22 a) and 22 b) are renderings of a shoulder socket illustrating fixed-threshold VDP limitations.

Selecting a threshold for VDP is problematic for shoulders where the two surfaces are in close contact. FIG. 22 a) shows a rendering of a shoulder with hole artifacts circled in the resulting image. These artifacts occur in areas where the threshold is not reached, which causes no accumulation of color and opacity using the skip-to-threshold VDP algorithm. Reducing the threshold to eliminate the artifacts, concomitantly reducing the maximum value of the cartilage in the transfer function, results in eroded areas of the socket, circled in blue in FIG. 22(b). In cases such as this, there is no setting for the threshold that both avoids hole artifacts and prevents erosion of the surface.

Figure 23:
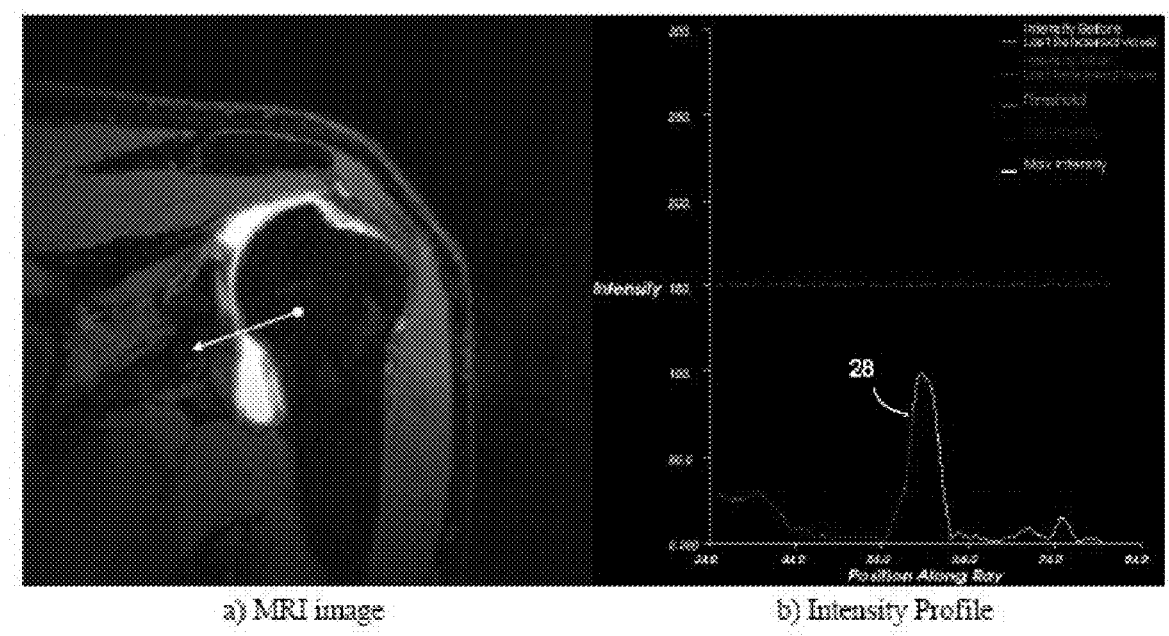
FIG. 23 a) is a shoulder MRI image and FIG. 23 b) is a corresponding intensity profile along a ray where the threshold is not reached.

FIG. 23 shows a slice from the MRI data used to generate these images. An intensity profile along the ray indicated in FIG. 23 a), where the cartilage surfaces appear to be touching is shown in FIG. 23 b). In FIG. 23, the lowermost dotted line represents the minimum threshold, and the uppermost dotted line represents the maximum voxel intensity. The portion of the intensity profile before reference numeral 28 represents the intensity before the last rendered voxel and the portion of the intensity profile after reference numeral 28 represents the intensity after the last rendered voxel. Although the intensity peak is below the threshold, a clear peak exists. In areas where the cartilage surfaces are close to touching, each voxel contains contributions from both cartilage and fluid. Volume averaging therefore causes such voxels to have values higher than those of voxels containing just cartilage, and lower than voxels containing just fluid. The peak therefore represents the highest concentration of fluid along the ray, ignoring the presence of noise. Because of this, the peak is the optimal location at which to reset the accumulated color and opacity, as it is the most likely point of separation between the two surfaces. To find the intensity peak representing the optimal point of separation along each ray, a technique more sophisticated than the fixed threshold must be used.

A key insight is that finding the separation between the regions of interest in the volume is the key to optimal occlusion determination, rather than determining occlusion based on the definition of the surfaces rendered. The benefits of such an approach are twofold: the occlusion determination and the transfer function defining the surfaces can be independently optimized, and the viewpoint can be moved seamlessly from occluded positions to unoccluded positions while still displaying the surface of interest, as no counting of surfaces is performed.

Hole artifacts when using a fixed-threshold VDP can also occur when rendering ureters for virtual ureteroscopy. This can occur in areas where the ureter narrows, as there will be a smaller concentration of contrast. Finding the intensity peak along the ray is also desirable in this case.

Intensity Peak Determination Methods

Global Maximum

One possible method for finding the fluid's intensity peak is to search for the global maximum value along the ray. This technique does not always work, however, as there are often cases in which multiple layers of fluid are present along a ray. If the maximum value along a ray lies in a layer behind the first, the ray will reset in that layer of fluid. This can cause unwanted removal of portions of the surface of interest.

First Local Maximum

Instead, what is needed is to find the first local intensity maximum corresponding to the peak of interest. In the ideal case, this can be performed by simply testing the current sample's value against the value of the next sample. If the current sample's value is greater than the next sample's value, then it represents an intensity peak. This approach finds the intensity peak from viewpoints inside the humeral head, viewpoints inside the cartilage surface of the humeral head, and viewpoints inside the joint capsule on the near side of the intensity peak. It also works from viewpoints inside the joint capsule on the far side of the true intensity peak, as the first sample will be considered an intensity peak, causing immediate resetting of the accumulated color and opacity. This algorithm therefore enables navigation from the humeral head to positions within the joint space, while always rendering the socket surface of interest.

A major drawback to this implementation is that it is sensitive to noise. Defining a peak in this manner will cause small noise spikes to trigger the resetting of color and opacity. One method of finding the true intensity peak is to use two thresholds to select peaks of a given height and a given intensity.

Dual-Threshold First Local Maximum (Canny, 1986) describes a 2D edge-detection algorithm, also referred to as Canny edge detection, that uses two thresholds to link strong edges possessing high gradient magnitudes with weak edges possessing lower gradient magnitudes, removing weak edges that are not connected to strong ones.

When detecting intensity peaks along rays, two thresholds can be used to select peaks of a large enough magnitude and to eliminate spurious peaks. The algorithm works by finding the first local maximum, then continuing forward until a sample value is found that is a specified amount, determined by the first threshold parameter, below the peak. This threshold reduces sensitivity to noise spikes by finding peaks of a specified relative height. If such a value is found, the accumulated color and opacity is reset. Ray traversal is started again from the peak.

Figure 25:
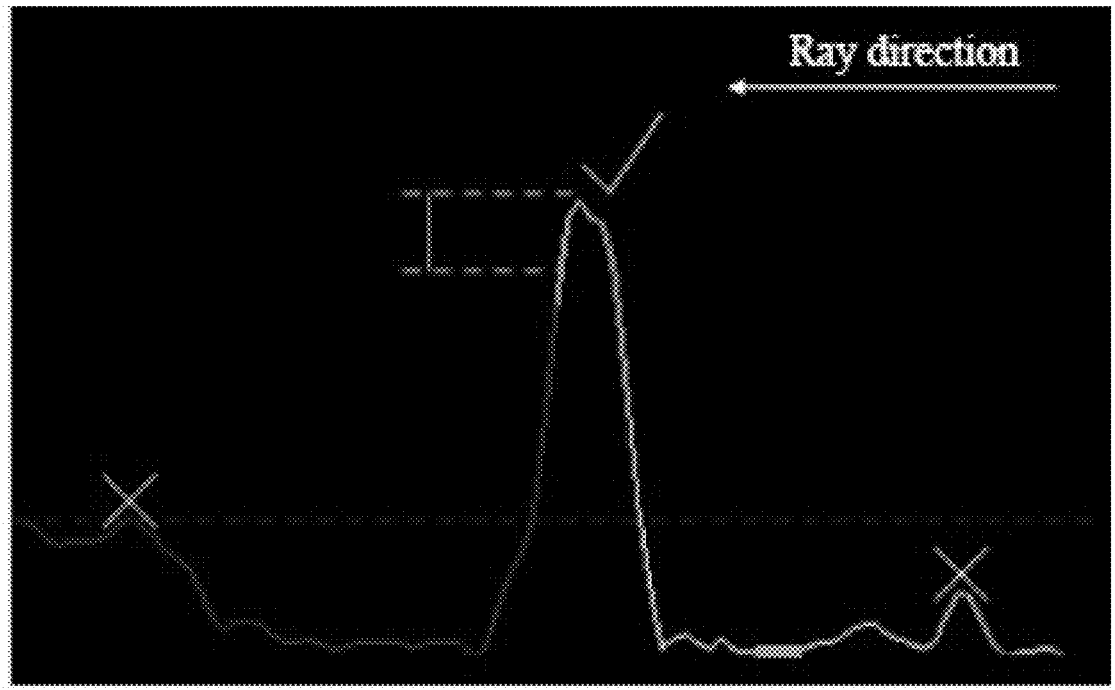
FIG. 25 is a diagram illustrating first local maximum VDP thresholds.

To further ensure that spurious peaks are not identified, a lower threshold value is used to eliminate peaks with absolute intensities below this value. This can be useful because the signal-to-noise ratio is lower at lower intensities, and there may also be inhomogeneities in the signal at lower intensities. The lower threshold is independent of the transfer function setting, unlike with fixed-threshold VDP, and a wide range of values for the lower threshold usually produce the same result, making it much more robust than fixed-threshold VDP. Pseudocode for this algorithm is given in FIG. 24, and an intensity profile illustrating the two thresholds is shown in FIG. 25. In FIG. 25, the lowermost dotted line represents the initial threshold that a peak must satisfy to be considered a potential local maximum. The distance between the upper two dotted lines represents the distance that the peak must fall from its maximum value to be considered a local maximum.

Figure 26:
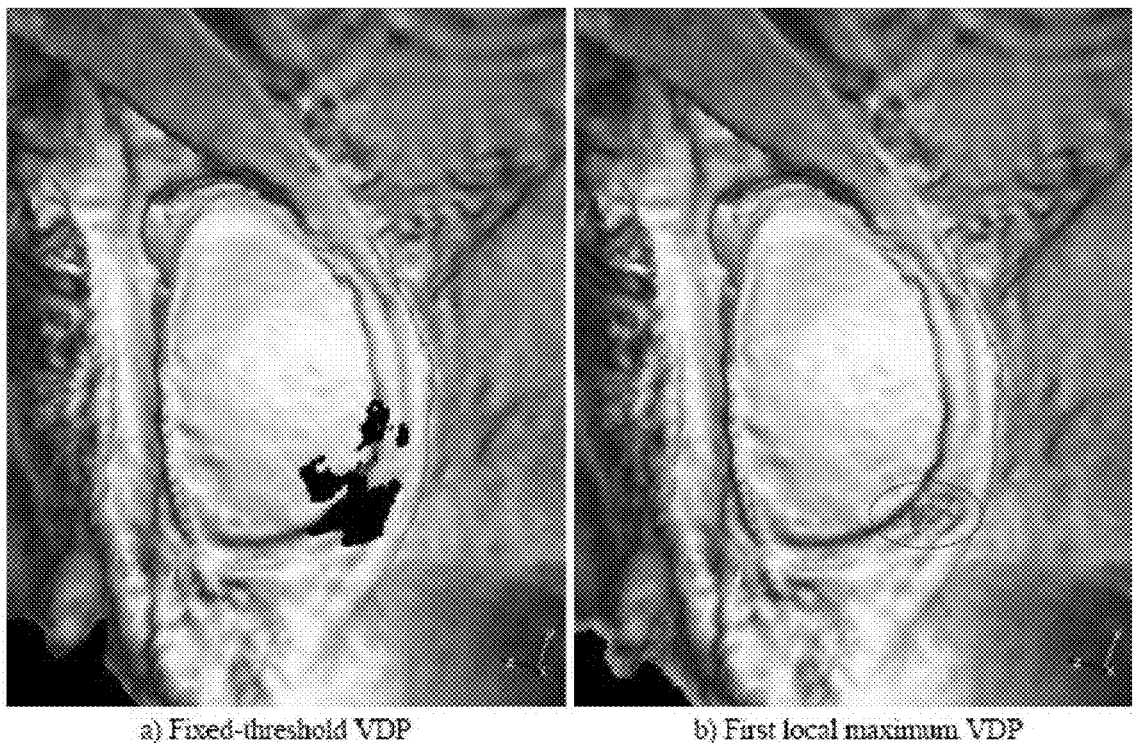
FIGS. 26 a) and 26 b) illustrate renderings of a shoulder from MRI data.

FIG. 26 compares rendering using the fixed-threshold VDP and the local maximum VDP algorithm. The holes are successfully filled in; however, some artifacts are introduced in the area circled in red. These artifacts occur because the gradient is not well defined at the peak, which results in inconsistent surface normals being generated when the peak lies within the range of values specified by the transfer function. One possible solution is to step forward a fixed amount after finding the peak before starting to accumulate color and opacity again. This may achieve nicer-looking results in some cases, but is an ad-hoc solution, as the amount to step forward is difficult to determine, and can erode the surface.

Figure 27:
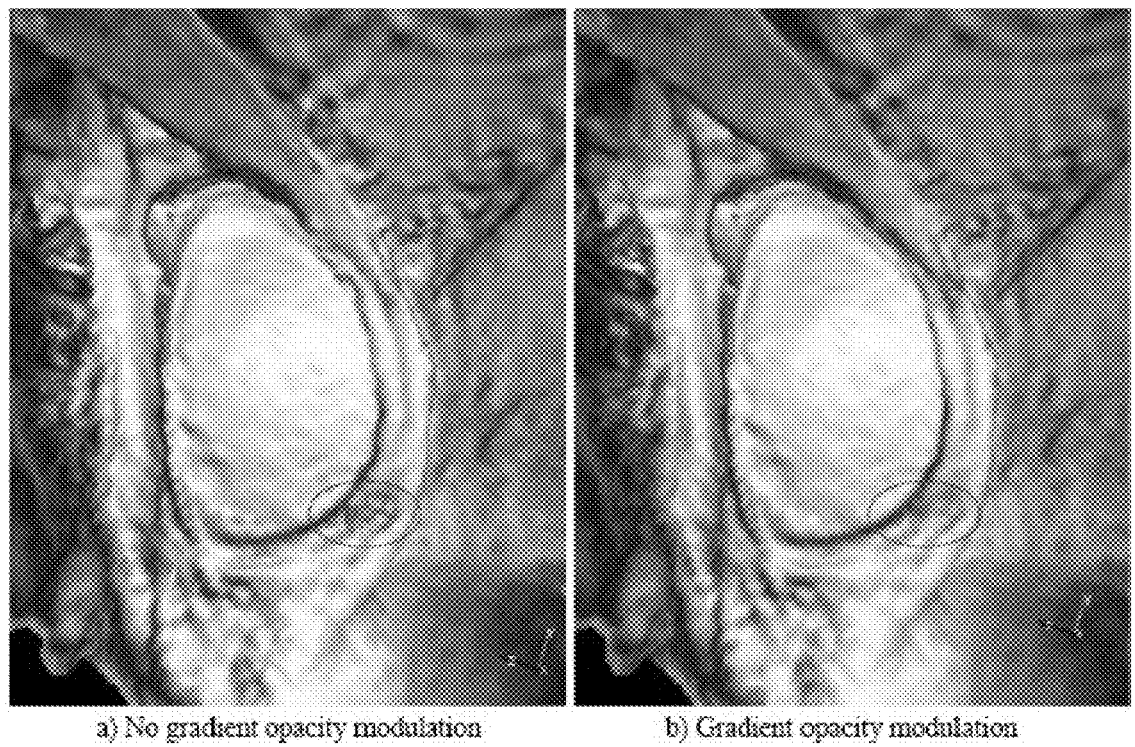
FIGS. 27 a) and 27 b) are renderings of a shoulder illustrating that artifacts can occur in areas of low gradient.

A better choice is to employ a gradient opacity transfer function that reduces contributions of voxels with small gradients (FIG. 27). The use of gradient opacity transfer functions to reduce the opacity of voxels with small gradients is suggested in (Levoy, 1988) to better define surfaces in the volume. This approach therefore improves the surface definition in general, while still keeping the transfer function settings separate from the occlusion determination.

Figure 28:
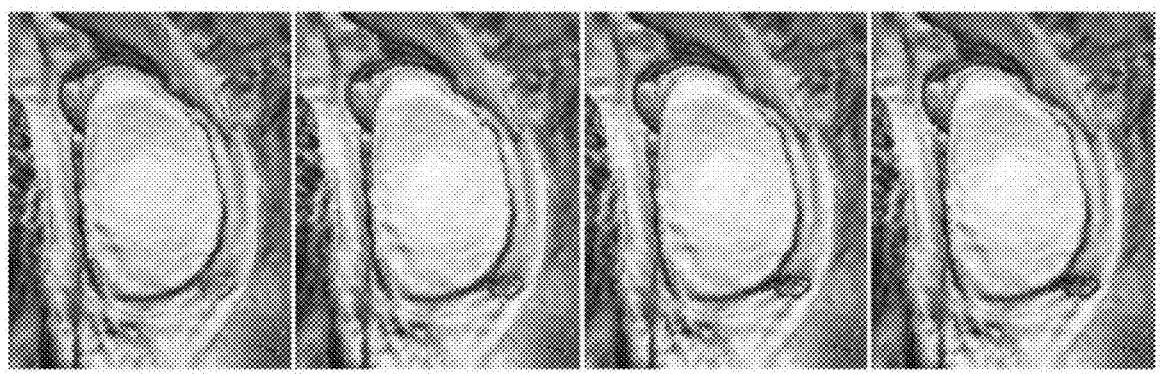
FIG. 28 illustrates renderings of a shoulder where areas where surfaces are touching are highlighted in various ways.

Areas with a small intensity peak can represent places where the surfaces are actually touching, and are the same areas that are problematic for segmentation techniques. These areas can be highlighted in various ways by adjusting the color transfer function based on the relative or absolute intensity at the peak to convey the fact that the surface displayed here is less certain than in other areas (FIG. 28).

The point of introducing the dual thresholds is to deal with noise in the data. However there are other methods than can be employed, both to remove noise and to introduce a notion of scale, discussed in the next section.

Noise and Filtering

The standard way of reducing noise from a signal processing standpoint is to apply a lowpass filter. A Gaussian filter is commonly used. The mathematical formula for an isotropic 2D Gaussian $g(x, y)$ is:

$$g(x, y) = \frac{1}{\sqrt{2\pi}\sigma} e^{-\frac{1}{2}\left(\frac{x^2+y^2}{\sigma^2}\right)},$$

where $\sigma$ is the standard deviation of the Gaussian. The Gaussian is very similar to the ideal smoothing filter for 2D edge detection described in (Canny, 1986), and is often used in practice as a replacement. In Canny edge detection, the original image is smoothed, a simple edge detector is applied, and then intensity peaks representing edges are detected. FOR performs a similar task along each ray, but without the edge detection step.

Figure 29:
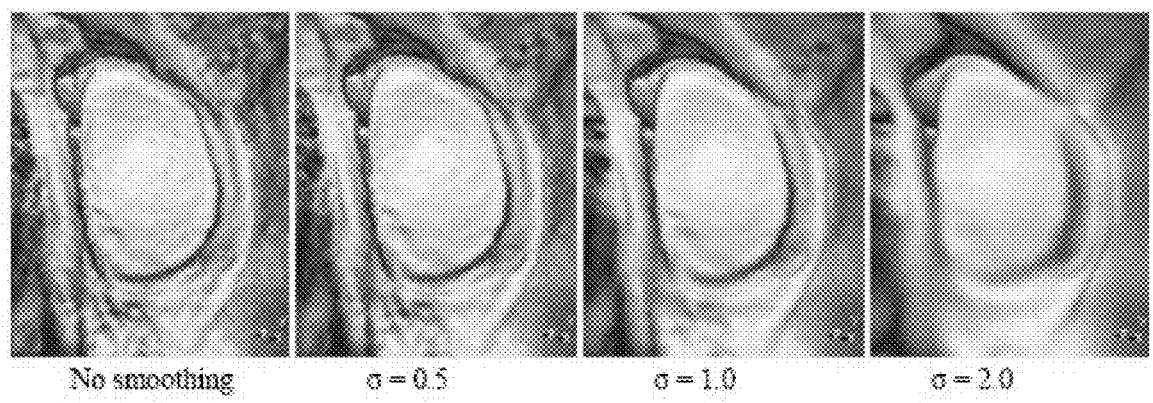
FIG. 29 illustrates rendering of a shoulder socket from MRI data smoothed with a Gaussian function with different standard deviation values, increasing from left to right.

The Fourier transform of a Gaussian is another Gaussian, but with an inverse standard deviation. Filtering by multiplying with a Gaussian in the frequency domain is therefore equivalent to convolution with a different Gaussian in the spatial domain. The $\sigma$ of the Gaussian convolution kernel controls its width, and therefore the amount of amount of smoothing performed on the data. Smoothing to remove noise also smoothes other high frequency data, such as small bumps and edges. Therefore, simply smoothing the data to remove noise and then rendering the smoothed data it is not optimal, as this will smooth away small features in the data that are of interest to the physician (FIG. 29).

Although using smoothed data is not desirable for rendering, it has two properties that are desirable for determining occlusion. The first is noise removal for finding intensity peaks representing the separation between surfaces. By smoothing, the average over a local 3D neighborhood at each voxel is taken into account, rather than just along a 1D ray. The second desirable feature is control over the scale of objects being separated. For example, with a bone fracture, it might be desirable to skip over multiple small fragments to see the surface beyond them.

FOR takes advantage of the fact that the best data set used for rendering might not be the best data set used for determining occlusion. FOR uses the smoothed data set to locate separating surfaces, while using the original data set to render.

Flexible Occlusion Rendering

With FOR, an auxiliary data set is used for determining occlusion, while rendering the original data. The VDP methods discussed both fit into the FOR framework. The more general term FOR will be used instead of VDP for the remainder of the description herein.

Fixed-Threshold FOR

Fixed-threshold VDP can be thought of as a specific instance of FOR that uses a thresholded data set for occlusion determination. The implementation of fixed threshold VDP describe above is not the same as using a thresholded dataset, as the thresholding operation is being performed on a tri-linearly interpolated value along the ray, not on the actual voxel values. Using nearest-neighbor interpolation for the threshold would have the same result as a thresholded dataset. In this case, the test to perform for resetting along the ray becomes a simple test, as the thresholded data set is a binary mask. Because the thresholding operation is so computationally inexpensive, it is easier to perform the computation while rendering, without computing a separate thresholded datasets. There may be some systems in which memory access is cheap enough that reading from a thresholded dataset and performing a binary comparison will be computationally less expensive than performing a comparison on the sample value and the threshold value.

First Local Maximum FOR

First local maximum VDP does not use a smoothed version of the original data set. First local maximum FOR uses a smoothed version of the original data set at some scale. The local maximum peak-finding algorithm is performed on the smoothed data set. If the scale desired is that of the original data, no auxiliary data set needs to be generated, although it is possible to always use a secondary data set for simplicity of implementation. There may be some performance decrease when implemented as an auxiliary data set, as two data values must be generated for each sample point.

These two data sets are useful for virtual arthroscopy from MRI data and virtual ureteroscopy from CT data. A different but related type of auxiliary data set is necessary for the third application presented herein, knee fracture visualization from CT data.

Knee Fracture Visualization

Figure 30:
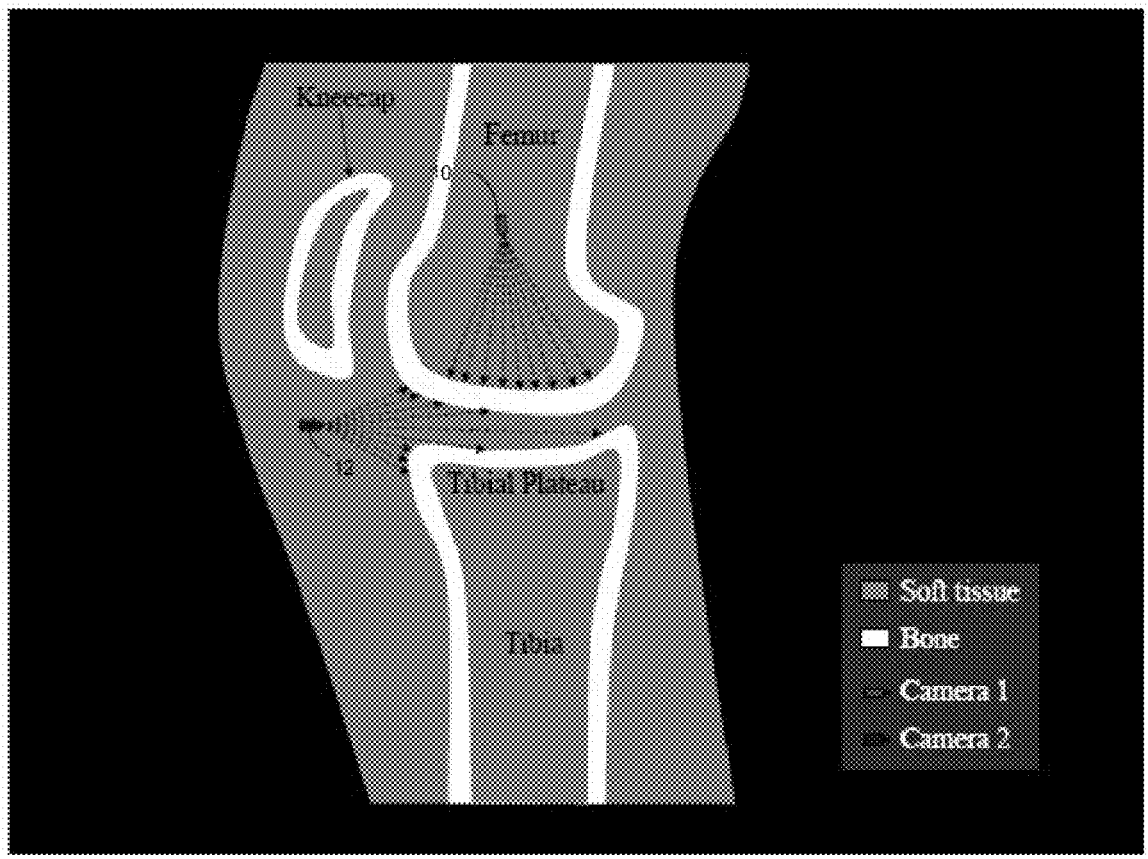
FIG. 30 is a diagram of a sagittal slice of a knee CT, showing the desired viewpoint for a tibial plateau fracture (Camera 1) and the types of viewpoints possible with standard volume rendering (Camera 2).

For diagnosing knee fractures, CT is often used, as it gives excellent bone contrast. And idealized diagram of a knee as seen using CT is shown in FIG. 30. The hard outer surface of the bones in the joint has a very high intensity; whereas the inside of the bone has a lower intensity, in the same range as that of the soft tissue and fluid present in the joint.

The most common type of knee fracture diagnosed using CT data is a tibial plateau fracture. FIG. 30, Camera 1 shows the view most useful for diagnosing such a fracture. The occluding material of the femur makes such views impossible with standard volume rendering. FIG. 30, Camera 2 shows a view available with standard volume rendering.

Problems with FOR

Figure 31:
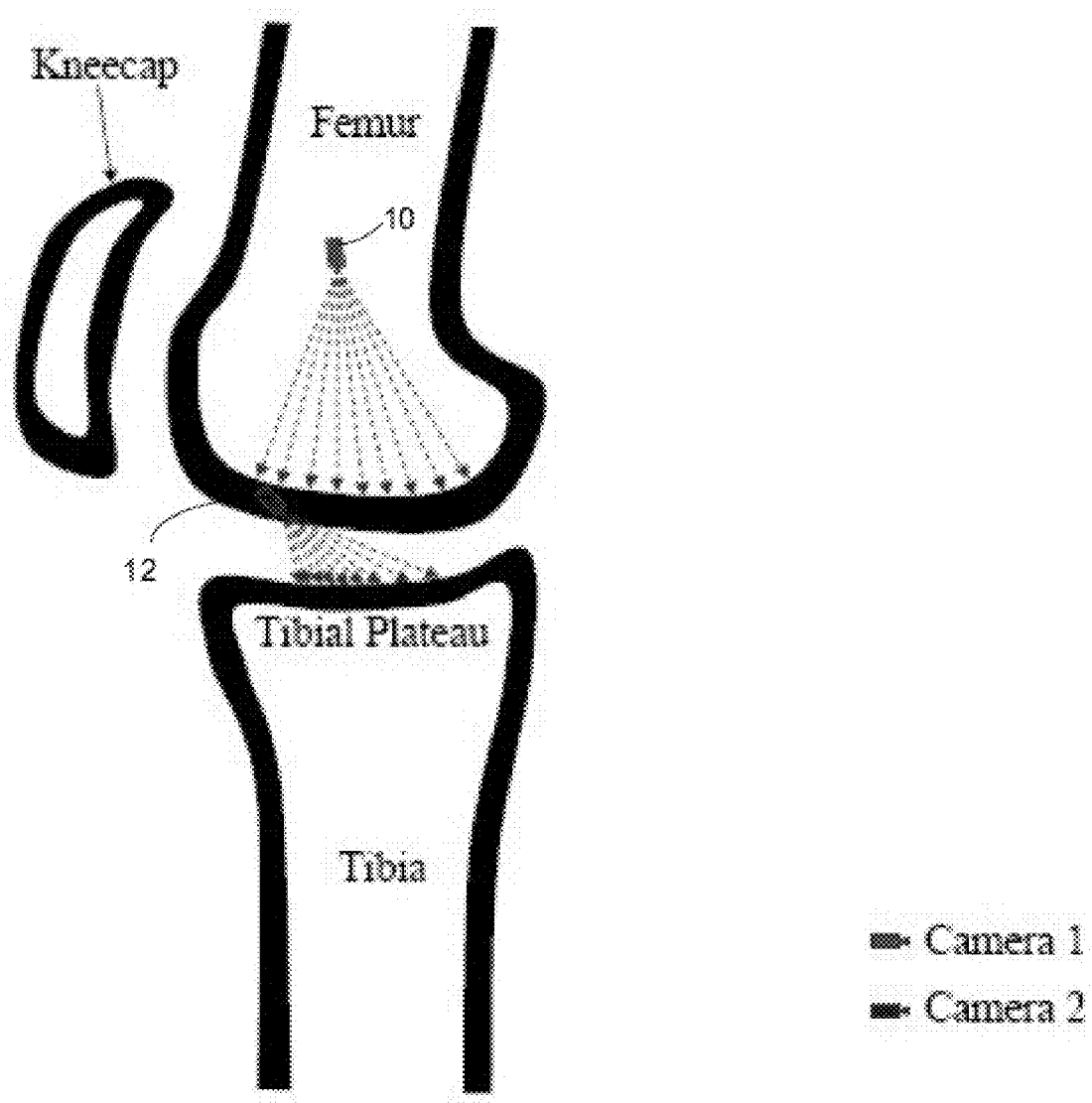
FIG. 31 is a diagram of a thresholded data set for knee fracture visualization. Only views from within the hard bone surface of the femur (Camera 2) are possible.

Because the space between the surfaces of the joint has a lower range of intensities than that of the bone surfaces to be rendered, a possible choice for a data set to define the separation used to determine occlusion using FOR is to apply a lower threshold to the data. In this case, all values below the threshold are set to 1, and all values above the threshold are set to 0. Defining the thresholding in this manner inverts the intensities, making the separation the highest intensity, as with virtual arthroscopy and virtual ureteroscopy. This approach only works for viewpoints just within the hard bone surface of the femur (FIG. 31, Camera 2), which is better than standard volume rendering, but far from optimal. For viewpoints on the inside of the bone, the accumulated color and opacity is immediately reset, and the inside surface of the femur is rendered, giving the same result as standard volume rendering (FIG. 31, Camera 1). The same problem occurs if attempting to use the first local maximum FOR algorithm.

Flood-Filled Mask

Figure 32:
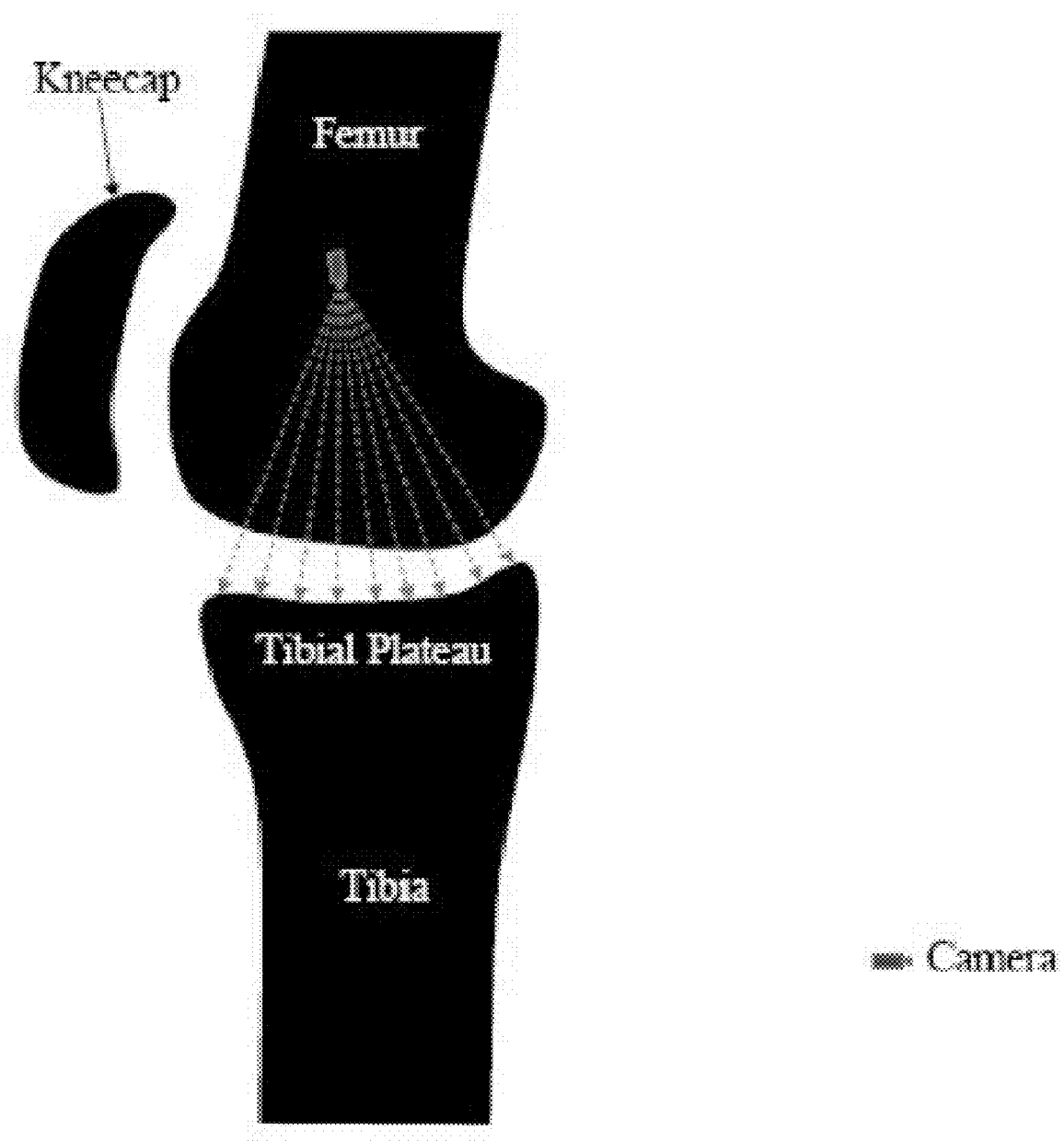
FIG. 32 is a diagram of a thresholded and flood-filled data set for knee fracture visualization. Views from within the femur show the surface of the tibial plateau.

Performing a flood fill operation on the thresholded data enables FOR to correctly determine the separation used to reset accumulated color and opacity (FIG. 32). Before performing the flood fill, an axial slice of pixels set to 0 is added above and below the volume. This ensures that the interiors of the bones, which have been thresholded to a value of 1, are closed off from the edges of the image. The flood fill operation then sets to 0 all voxels with value 1 that are not connected to the edge of the image by other voxels with value 1. In this manner, the interior of the bones is filled in, resulting in a mask of the bones and the separation between the bones.

With the flood-filled mask, FOR can be employed to reset the accumulated color and opacity whenever a 1 is encountered along the ray in the mask, which represents the separation between the surfaces. This enables seamless transitions from viewpoints exterior to the bones being rendered to viewpoints within the bones being rendered, while always displaying the far surface of interest.

Figure 33:
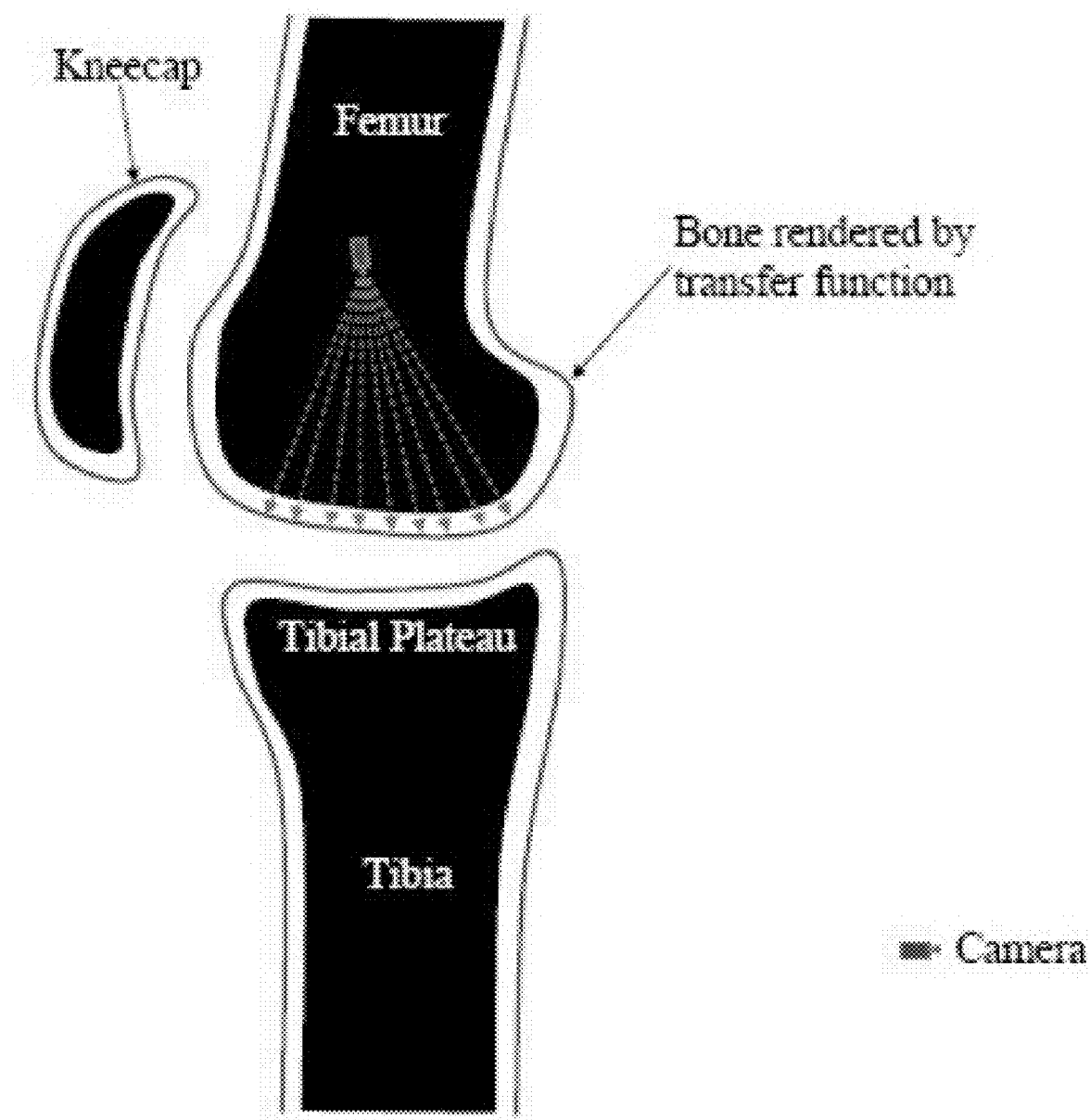
FIG. 33 is a diagram of a knee illustrating that overestimation of the separation between bones by setting the threshold too high can cause the resetting to happen early, which causes the near surface to be rendered.
Figure 34:
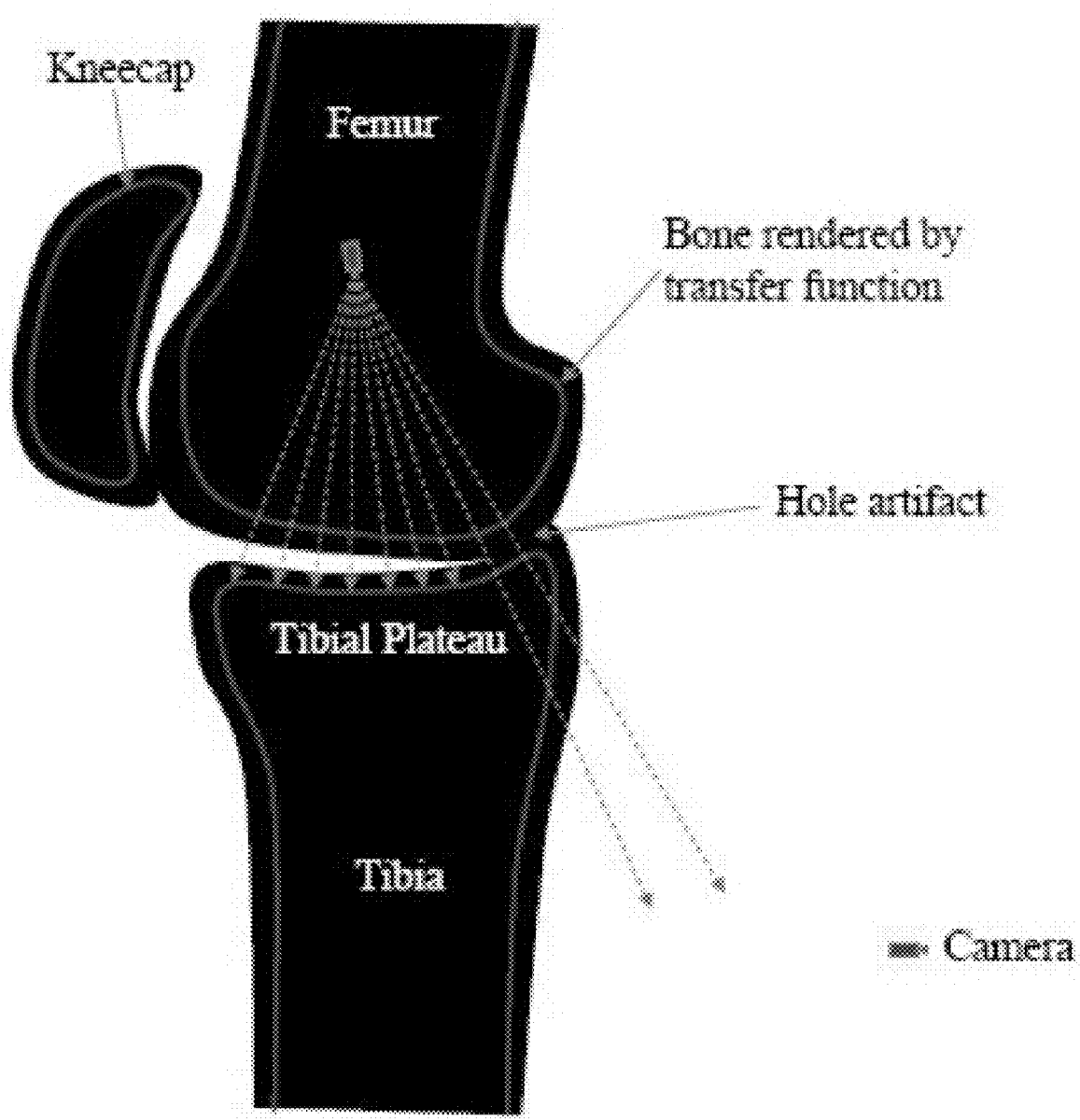
FIG. 34 is diagram of a knee illustrating that underestimation of the separation by setting the threshold too low can result in hole artifacts.

A problem similar to that encountered when using fixed-threshold VDP arises with this binary mask. The threshold must be tightly coupled to the transfer function used to render the surfaces because the resetting occurs immediately when entering the separation mask. Overestimating the separation by setting the threshold too high can cause the resetting to happen early, which causes the near surface to be rendered (FIG. 33). Conversely, under-estimating the separation by setting the threshold too low can cause hole artifacts (FIG. 34). This is especially problematic because the thresholding and flood filling is performed as a preprocess, and cannot be recomputed easily.

Flood-Filled Mask at Scale

Figure 35:
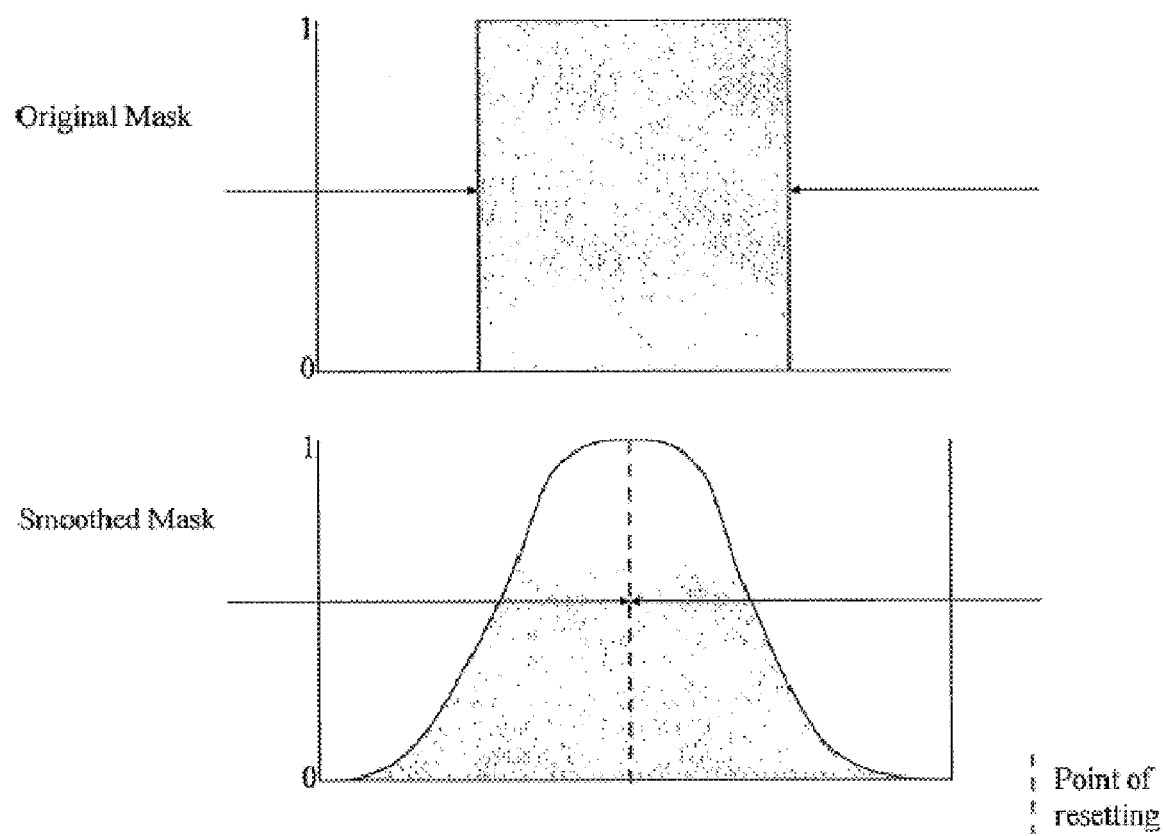
FIG. 35 illustrates an original mask and a smoothed mask for forming intensity peaks.

A more robust method for finding the separation incorporates thresholding, flood-filling, and smoothing. By smoothing the thresholded and flood-filled data, intensity peaks are formed near the center of the separation (FIG. 35).

This process can be seen as an approximation of a medial axis transform of the separation. The first local maximum method can therefore be used to determine intensity peaks for resetting. This method is more robust to an overestimate of the separation, as it will reset towards the center of the separation. It can also help with small holes, as smoothing the edges of the hole will create small intensity peaks that can be found with a low threshold setting.

Recap

Exemplary insights and features in FOR are summarized as follows:

Finding separating features between objects, rather than the boundaries of the objects themselves, enables more robust determination of undesired occlusions.

The location of these separating features in data sets that have noise and partial-volume effects can be performed robustly by finding intensity peaks of a minimum height and a minimum intensity.

These features can be found during the rendering process, without a need for presegmentation.

These features can be found using the same dataset used for rendering, or a separate dataset optimized for occlusion determination.

Finding the separation enables seamless transition from occluded viewpoints to occluding viewpoints.

The scale of the dataset used for feature-detection can be adjusted without altering the resolution of the data being rendered.

For the applications presented herein finding the first separating feature has proven useful, however finding multiple separations or the last separation, are also possible, depending on the application.

Exemplary System and Method for Flexible Occlusion Rendering

Figure 36:
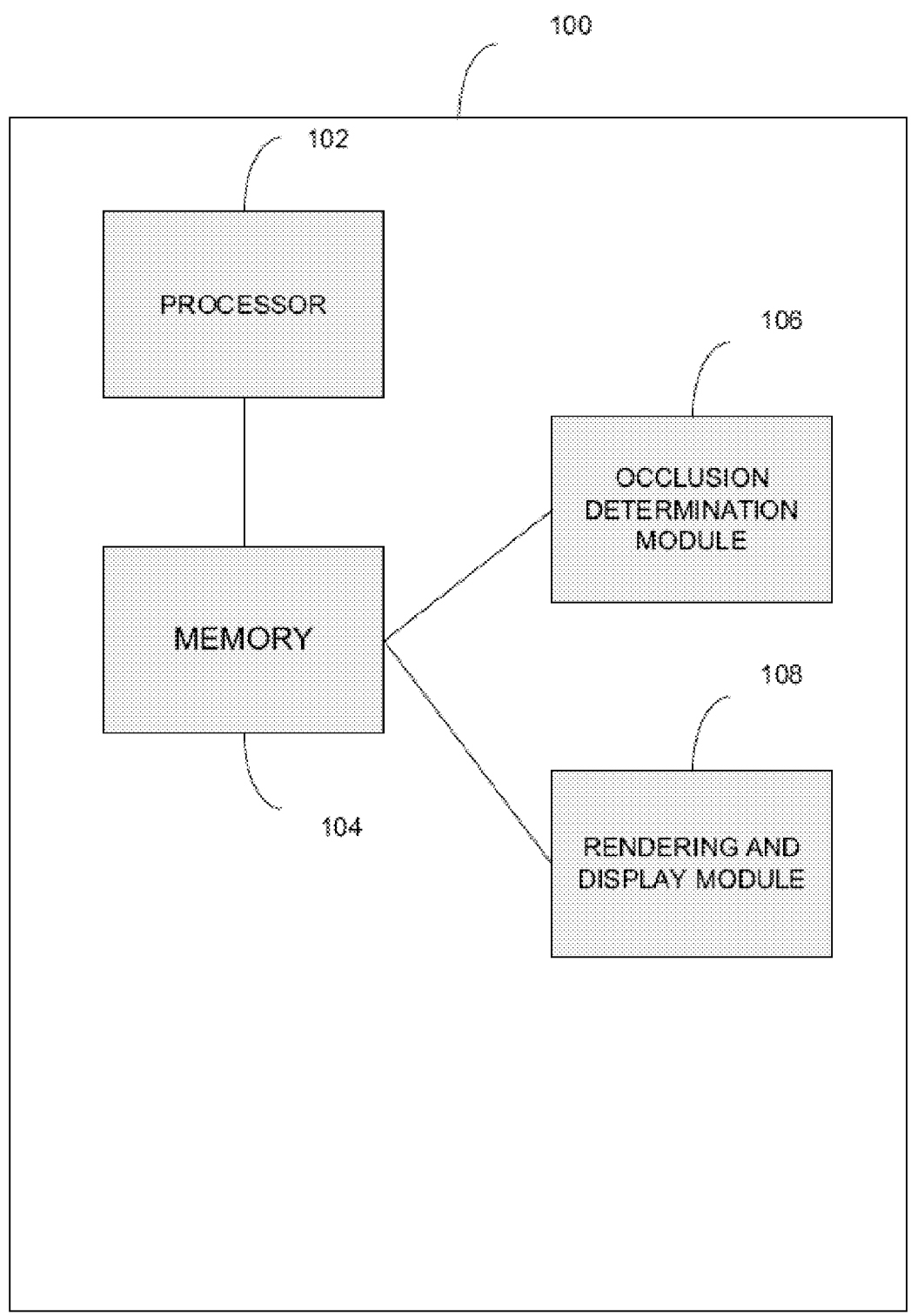
FIG. 36 is a block diagram illustrating an exemplary system for flexible occlusion rendering according to an embodiment of the subject matter described herein.

As indicated above, the subject matter described herein for flexible occlusion rendering can be implemented in hardware, software, firmware, or any combination thereof. FIG. 36 is a block diagram illustrating a general purpose computing platform 100 on which the present subject matter may be implemented. General purpose computing platform 100 may be any suitable computing platform capable of executing programs. For example, platform100 may be a personal computer or a workstation. In an alternate implementation, platform 100 may be a server, and the software for flexible occlusion rendering may be implemented on the server so that users can access the software remotely to render images from occluded viewpoints in medical image datasets.

Platform 100 may include a processor 102 and memory 104. Memory 104 may store computer executable instructions for execution by processor 102. In the illustrated example, these computer executable instructions include occlusion determination module 106 and rendering and display module 108. Occlusion determination module 106 may include computer executable instructions for performing the steps described herein for making occlusion determinations along rays cast in image data sets. Rendering and display module 108 may include computer executable instructions for performing the steps described herein for rendering and displaying images from medical image data for a given occlusion determination. Occlusion determination module 106 and rendering and display module 108 are illustrated separately to indicate that their respective functions can be implemented separately and independently optimized. However, it is understood that modules 106 and 108 can be implemented as part of the same computer program without departing from the scope of the subject matter described herein.

Figure 37:
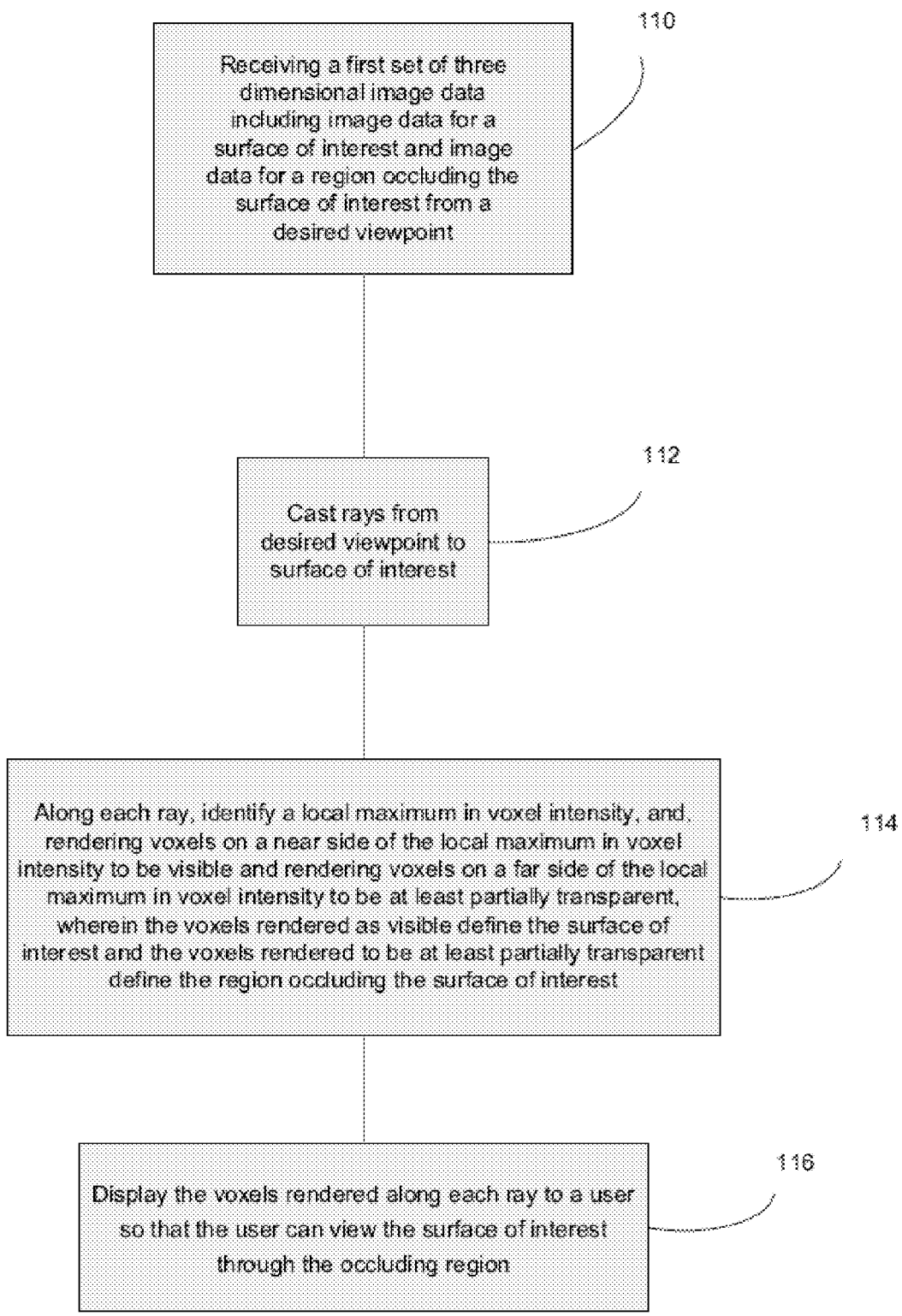
FIG. 37 is a flow chart of an exemplary process for flexible occlusion rendering according to an embodiment of the subject matter described herein.

FIG. 37 is a flow chart illustrating exemplary overall steps of a process for flexible occlusion rendering according to an embodiment of the subject matter described herein. Referring to FIG. 37, in step 110, a first set of three dimensional image data including image data for a surface of interest and image data for a region occluding the surface of interest from a desired viewpoint is received. For example, a set of CT data, MRI data, or a combination of CT or MRI data may be received by occlusion determination module 106. In step 112, rays are cast from a desired viewpoint to the surface of interest. For example, occlusion determination module 106 may allow a user to select a desired viewpoint and a surface of interest to be rendered in the set of medical image data and may cast rays from that viewpoint to the surface of interest.

In step 114, along each ray, a local maximum in voxel intensity is identified, voxels on a near side of the local maximum in voxel intensity are rendered as visible, and voxels on a far side of the local maximum in voxel intensity (where the near and far sides are defined from the camera viewpoint) are rendered to be at least partially transparent, wherein the voxels rendered as visible define the surface of interest and the voxels rendered to be at least partially transparent define at least a portion of the region occluding the surface of interest. For example, occlusion determination module 106 may identify a local maximum in voxel intensity along each ray. The local maximum may be used by rendering and display module 108 to determine where along each ray to begin rendering voxels as visible by, in one example, resetting accumulated color and opacity values along each ray. In step 116, the voxels rendered along each ray are displayed to a user so that the surface of interest can be viewed through the occluding region. For example, rendering and display module 108 may display the occluding region as fully or partially transparent so that the surface of interest can be viewed.

REFERENCES

The disclosure of each of the following references is hereby incorporated herein by reference in its entirety.

Canny, J. (1986). A computational approach to edge detection. IEEE Transactions on Pattern Analysis and Machine Intelligence, 8(6):679-698.

Clarke, J. P. (2004). personal communication.

Cootes, T. F. and Taylor, C. J. (1998). Active shape models-smart snakes. In Proceedings of European Conference on Computer Vision, pages 484-498.

Cootes, T. F., Edwards, G. J., and Taylor, C. J. (1992). Active appearance models. In Proceedings of British Machine Vision, pages 266-275.

Diefenbach, P. J. (1996). Pipeline rendering: Interaction and realism through hardware-based multi-pass Rendering. PhD thesis, Department of Computer Science, University of Pennsylvania.

Everitt, C. (2002). Interactive order-independent transparency. Technical report, Nvidia Corporation.

Kass, M., Witkin, A., and Terzopoulos, D. (1988). Snakes: Active contour models. International Journal of Computer Vision, 1(4):321-331.

Levoy, M. (1988). Display of surfaces from volume data. IEEE Computer Graphics and Applications, 8(3):29-37.

Mammen, A. (1989). Transparency and antialiasing algorithms implemented with the virtual pixel maps technique. IEEE Computer Graphics and Applications, 9(4):43-55.

Nagy, Z. and Klein, R. (2003). Depth-peeling for texture-based volume rendering. In Proceedings of 11th Pacific Conference on Computer Graphics and Applications, pages 429-433.

Osher, S. and Sethian, J. A. (1988). Fronts propagating with curvature dependent speed: Algorithms based on hamilton-jacobi formulations. Journal of Computational Physics, 79:12-49.

Sethian, J. A. (1996). A marching level set method for monotonically advancing fronts. In Proceedings of National Academy of Sciences.

Viola, I., Kanitsar, A., and Gröler, M. E. (2004). Importance-driven volume rendering. In Proceedings of IEEE Visualization, pages 139-146.

What is claimed is:

1. A method for flexible occlusion rendering comprising: at a computing platform including a processor:
   receiving a first set of three dimensional image data including image data for a surface of interest and image data for a region occluding the surface of interest from a desired viewpoint;
   casting a plurality of rays from the viewpoint to the surface of interest;
   along each ray, identifying a local maximum in voxel intensity, and, rendering voxels on a near side of the local maximum in voxel intensity to be visible and rendering voxels on a far side of the local maximum in voxel intensity to be at least partially transparent, wherein the voxels rendered as visible define the surface of interest and the voxels rendered to be at least partially transparent define the region occluding the surface of interest;
   and displaying the voxels rendered along each ray to a user so that the user can view the surface of interest through the occluding region.

2. The method of claim 1 wherein the identifying of the local maximum is performed independently of the rendering.

3. The method of claim 2 comprising independently optimizing the identifying of the local maximum and the rendering.

4. The method of claim 1 wherein casting a plurality of rays includes casting the rays in a smoothed version of the first dataset and wherein rendering the voxels includes rendering the voxels in a version of the first dataset with original color and intensity values.

5. The method of claim 1 wherein the first data set comprises topography (CT) data, wherein casting a plurality of rays includes casting the rays in the first data set and wherein rendering the voxels includes rendering the voxels using data in a second data set, wherein the data in the second data set comprises magnetic resonance imaging (MRI) data.

6. The method of claim 1 wherein identifying a local maximum along each ray includes traversing each ray using a first scale for making an occlusion determination and wherein rendering the voxels includes rendering the voxels at a second scale smaller than the first scale.

7. The method of claim 1 wherein identifying a local maximum along each ray includes identifying a first voxel having an intensity that is above a first threshold along each ray, after identifying the first voxel, determining whether voxel intensities after the first voxel are below a second threshold lower than the first threshold, and, in response to the identifying the first voxel and determining that the voxel intensities after the first voxel are lower than the second threshold, identifying the first voxel as the local maximum.

8. The method of claim 7 wherein the first and second thresholds are independent of a transfer function used for the rendering.

9. The method of claim 1 wherein identifying a local maximum in intensity includes identifying a first local maximum in intensity.

10. The method of claim 1 wherein rendering the voxels includes utilizing a gradient occlusion transfer function for the rendering.

11. The method of claim 1 wherein rendering the voxels includes adjusting a color transfer function to indicate decreased certainty when surfaces being rendered are close to each other.

12. The method of claim 1 wherein identifying a local maximum includes identifying plural local maxima along each ray and wherein rendering the surface includes rendering as visible a surface after any of the local maxima.

13. The method of claim 1 wherein identifying a local maximum includes identifying the local maximum in a thresholded version of the first data set and wherein rendering the voxels includes rendering the voxels from a version of the first dataset with original color and intensity values.

14. The method of claim 1 wherein identifying a local maximum includes identifying the local maximum in a thresholded, flood filled version of the first data set and wherein rendering the voxels includes rendering the voxels using original color and intensity values for the voxels in the first data set.

15. The method of claim 1 wherein identifying a local maximum includes identifying a local maximum in a thresholded, flood-filled, smoothed version of the first data set and wherein rendering the voxels includes rendering the voxels using original color and intensity values for the voxels in the first data set.

16. The method of claim 1 wherein rendering the voxels before the local maximum as at least partially transparent and rendering the voxels after the local maximum as visible includes accumulating color and opacity values for voxels along each ray, and, in response to reaching the first local maximum, resetting the accumulated color and opacity values, and, after the first local maximum, continuing to accumulate the color and opacity values.

17. A system for flexible occlusion rendering, the system comprising:
    an occlusion determination module for receiving a first set of three dimensional image data including image data for a surface of interest and image data for a region occluding the surface of interest from a desired viewpoint, for casting a plurality of rays from the viewpoint to the surface of interest, and for, along each ray, identifying a local maximum in voxel intensity; and
    a rendering and display module for rendering voxels on a near side of the local maximum in voxel intensity to be visible, for rendering voxels on a far side of the local maximum in voxel intensity to be at least partially transparent, wherein the voxels rendered as visible define the surface of interest and the voxels rendered to be at least partially transparent define the region occluding the surface of interest and for displaying the voxels rendered along each ray to a user so that the user can view the surface of interest through the occluding region.

18. The system of claim 17 wherein the identifying of the local maximum by the occlusion determination module is performed independently of the rendering by the rendering and display module.

19. The system of claim 18 wherein the identifying of the local maximum by the rendering module is optimized independently of the rendering by the rendering and display module.

20. The system of claim 17 wherein the occlusion determination module is configured to cast the rays in a smoothed version of the first dataset and wherein the rendering and display module is configured to render the voxels using original intensity and color values for the first dataset.

21. The system of claim 17 wherein the first data set comprises topography (CT) data, wherein the occlusion determination module is configured to cast the rays in the first data set and wherein the rendering and display module is configured to render the voxels using data in a second data set, wherein the data in the second data set comprises magnetic resonance imaging (MRI) data.

22. The system of claim 17 wherein the occlusion determination module is configured to traverse each ray using a first scale for making an occlusion determination and wherein the rendering and display module is configured to render the voxels at a second scale smaller than the first scale.

23. The system of claim 17 wherein the occlusion determination module is configured to identify a first voxel having an intensity that is above a first threshold along each ray, after identifying the first voxel, to determine whether voxel intensities after the first voxel are below a second threshold lower than the first threshold, and, in response to the identifying the first voxel and determining that the voxel intensities after the first voxel are lower than the second threshold, to identify the first voxel as the local maximum.

24. The system of claim 23 wherein the first and second thresholds are independent of a transfer function used for the rendering.

25. The system of claim 17 wherein identifying a local maximum in intensity includes identifying a first local maximum in intensity.

26. The system of claim 17 wherein the rendering and display module is configured to render the voxels using a gradient occlusion transfer function for the rendering.

27. The system of claim 17 wherein the rendering and display module is configured to adjust a color transfer function to indicate decreased certainty when surfaces being rendered are close to each other.

28. The system of claim 17 wherein the occlusion determination module is configured to identify plural local maxima along each ray and wherein the rendering and display module is configured to render as visible a surface after any of the local maxima.

29. The system of claim 17 wherein identifying a local maximum includes identifying the local maximum in a thresholded version of the first data set and wherein rendering the voxels includes rendering the voxels using original color and intensity values for the voxels in the first data set.

30. The system of claim 17 wherein the occlusion determination module is configured to identify the local maximum in a thresholded, flood-filled version of the first data set and wherein the rendering and display module is configured to render the voxels using original color and intensity values for the voxels in the first data set.

31. The system of claim 17 wherein the occlusion determination module is configured to identify the local maximum in a thresholded, flood-filled, smoothed version of the first data set and wherein the rendering and display module is configured to render the voxels using original color and intensity values for the voxels in the first data set.

32. The system of claim 17 wherein the rendering and display module is configured to accumulate color and opacity values for voxels along each ray, and, in response to reaching the first local maximum, resetting the accumulated color and opacity values, and, after the first local maximum, to continue to accumulate the color and opacity values.

33. A non-transitory computer readable medium having stored thereon executable instructions that when executed by the processor of a computer perform steps comprising:
    receiving a first set of three dimensional image data including image data for a surface of interest and image data for a region occluding the surface of interest from a desired viewpoint;
    casting a plurality of rays from the viewpoint to the surface of interest;
    along each ray, identifying a local maximum in voxel intensity, and, rendering voxels on a near side of the local maximum in voxel intensity to be visible and rendering voxels on a far side of the local maximum in voxel intensity to be at least partially transparent, wherein the voxels rendered as visible define the surface of interest and the voxels rendered to be at least partially transparent define the region occluding the surface of interest; and
    displaying the voxels rendered along each ray to a user so that the user can view the surface of interest through the occluding region.

* * * * *

UNITED STATES PATENT AND TRADEMARK OFFICE
CERTIFICATE OF CORRECTION

| | |
|---|---|
| PATENT NO. | : 7,961,187 B2 |
| APPLICATION NO. | : 12/532373 |
| DATED | : June 14, 2011 |
| INVENTOR(S) | : Borland et al. |

It is certified that error appears in the above-identified patent and that said Letters Patent is hereby corrected as shown below:

Col. 1, line 14 replace "This presently disclosed subject matter was made with U.S. Government support under Grant No. P41 EB002025-21 RS/RMT awarded by the National Institutes of Health. Thus, the U.S. Government has certain rights in the presently disclosed subject matter."

with --This invention was made with government support under Grant No. P41 EB002025-21 awarded by the National Institutes of Health. The government has certain rights in the invention.--

Signed and Sealed this
Thirty-first Day of July, 2012

David J. Kappos
*Director of the United States Patent and Trademark Office*